(12) United States Patent
Lee et al.

(10) Patent No.: US 9,900,139 B2
(45) Date of Patent: Feb. 20, 2018

(54) METHOD AND APPARATUS OF TRANSMITTING DATA IN MULTIPLE RF SYSTEM

(71) Applicant: LG ELECTRONICS INC., Seoul (KR)

(72) Inventors: Moon Il Lee, Gyeongki-do (KR); Seung Hee Han, Gyeongki-do (KR); Jae Hoon Chung, Gyeongki-do (KR); Hyun Soo Ko, Gyeongki-do (KR); Bin Chul Ihm, Gyeongki-do (KR)

(73) Assignee: LG Electronics Inc., Seoul (KR)

( * ) Notice: Subject to any disclaimer, the term of this patent is extended or adjusted under 35 U.S.C. 154(b) by 213 days.

(21) Appl. No.: 14/147,407

(22) Filed: Jan. 3, 2014

(65) Prior Publication Data

US 2014/0185552 A1 Jul. 3, 2014

Related U.S. Application Data

(62) Division of application No. 13/057,232, filed as application No. PCT/KR2009/004135 on Jul. 24, 2009, now abandoned.

(Continued)

(30) Foreign Application Priority Data

Dec. 29, 2008 (KR) ........................ 10-2008-0135216

(51) Int. Cl.
*H04L 5/00* (2006.01)
*H04L 27/26* (2006.01)
*H04L 5/14* (2006.01)

(52) U.S. Cl.
CPC ............ *H04L 5/0055* (2013.01); *H04L 5/001* (2013.01); *H04L 5/0035* (2013.01);

(Continued)

(58) Field of Classification Search
CPC ..... H04L 5/0055; H04L 4/0035; H04L 5/0039; H04W 52/40; H04W 72/12
See application file for complete search history.

(56) References Cited

U.S. PATENT DOCUMENTS

| | | |
|---|---|---|
| 2003/0035410 A1 | 2/2003 | Laroia et al. |
| 2004/0127219 A1 | 7/2004 | Chen et al. |

(Continued)

FOREIGN PATENT DOCUMENTS

| | | |
|---|---|---|
| KR | 10-2005-0053377 A | 6/2005 |
| KR | 2005-0053377 | 6/2005 |

(Continued)

OTHER PUBLICATIONS

R1-082024, 3GPP TDocs (written contributions) at meeting Meeting: R1-53—May 5, 2008 to May 9, 2008, Kansas City, http://www.3gpp.org/DynaReport/TDocExMtg--R1-53--26788.htm.*

(Continued)

*Primary Examiner* — Jeffrey M Rutkowski
*Assistant Examiner* — Fangyan Deng
(74) *Attorney, Agent, or Firm* — Morgan, Lewis & Bockius LLP

(57) ABSTRACT

A method and an apparatus of receiving data, the method carried in a user equipment (UE) configured to communicate with a first cell and a second cell, are provided. The method includes: receiving a first downlink data through a first downlink channel from the first cell, receiving a second downlink data through a second downlink channel from the second cell, and transmitting a data on a third channel, wherein the data transmitted on the third channel is related to a HARQ operation, and wherein the third channel is used to transmit the data related to the HARQ operation with respect to both the first data and the second data which have been received from the first and second cells, respectively.

14 Claims, 19 Drawing Sheets

Related U.S. Application Data

(60) Provisional application No. 61/085,881, filed on Aug. 4, 2008.

(52) U.S. Cl.
CPC .......... *H04L 5/0039* (2013.01); *H04L 5/0041* (2013.01); *H04L 5/0044* (2013.01); *H04L 5/1469* (2013.01); *H04L 27/2636* (2013.01); *H04L 5/0007* (2013.01)

(56) References Cited

U.S. PATENT DOCUMENTS

| | | | |
|---|---|---|---|
| 2006/0198377 A1* | 9/2006 | Kubota | H04L 1/1671 370/394 |
| 2006/0251031 A1 | 11/2006 | Anderson et al. | |
| 2007/0041429 A1 | 2/2007 | Khandekar | |
| 2007/0254679 A1* | 11/2007 | Montojo | H04L 5/0053 455/458 |
| 2008/0025241 A1 | 1/2008 | Bhushan et al. | |
| 2008/0076432 A1* | 3/2008 | Senarath | H04W 36/18 455/442 |
| 2008/0220787 A1 | 9/2008 | Stanwood et al. | |
| 2008/0299955 A1* | 12/2008 | Lee | H04W 4/06 455/414.1 |
| 2009/0103483 A1 | 4/2009 | Higuchi et al. | |
| 2010/0029320 A1 | 2/2010 | Malladi et al. | |
| 2010/0067604 A1* | 3/2010 | Bhadra | H04B 7/024 375/267 |
| 2014/0185552 A1* | 7/2014 | Lee, II | H04L 5/0039 370/329 |

FOREIGN PATENT DOCUMENTS

| | | |
|---|---|---|
| KR | 2007-0118637 | 12/2007 |
| KR | 2008-0013938 | 2/2008 |

OTHER PUBLICATIONS

Notice of Allowance dated Feb. 27, 2015, issued by the Korean Intellectual Property Office in Korean Patent Application No. 10-2008-0135216.
International Search Report from PCT/KR2009/004135.
European Office Action dated Dec. 15, 2016, issued by the European Patent Application No. 09805131.1.
LG Electronics, Inc., "On the Consideration of Technical Candidates for LTE-advanced," 3GPP TSG RAN WG1 Meeting #53, R1-081809, Kansas City, MO, USA, May 5-9, 2008.
Huawei, "Carrier aggregation in Advanced E-UTRA," 3GPP TSG RAN WG1 Meeting #53bis, R1-082448, Warsaw, Poland, Jun. 30-Jul. 4, 2008.
NTT DoCoMo, Inc., "Proposals for LTE-Advanced Technologies," 3GPP TSG RAN WG1 Meeting #53bis, R1-082575, Warsaw, Poland, Jun. 30-Jul. 4, 2008.
QUALCOMM Europe, "Influence of UE transceiver capability on system design," 3GPP TSG SA WG2 Meeting #53, S2-062073, Lisbon, Portugal, Jun. 26-30, 2006.

* cited by examiner

METHOD AND APPARATUS OF TRANSMITTING DATA IN MULTIPLE RF SYSTEM

CROSS REFERENCE TO RELATED APPLICATIONS

The present application is a divisional of U.S. patent application Ser. No. 13/057,232, filed on Feb. 2, 2011, the entire disclosure of which is hereby incorporated by reference for all purposes as if fully set forth herein. U.S. patent application Ser. No. 13/057,232 is a national stage of PCT International Application No. PCT/KR2009/004135, filed on Jul. 24, 2009, and claims the benefit of U.S. Provisional Application No. 61/085,881, filed on Aug. 4, 2008. The national stage application also claims the benefit of Korean Patent Application No. 10-2008-0135216, filed on Dec. 29, 2008.

TECHNICAL FIELD

The present invention relates to wireless communications, and more particularly, to a method and an apparatus of transmitting data in a multiple radio frequency (multi-RF) system.

BACKGROUND ART

Wireless communication systems are widely spread all over the world to provide various types of communication services such as voice or data. In general, the wireless communication system is a multiple access system capable of supporting communication with multiple users by sharing available system resources (e.g., bandwidth, transmit power, etc.). Examples of the multiple access system include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, etc.

While having almost the same complexity as the OFDMA, SC-FDMA has a lower peak-to-average power ratio (PAPR) due to a single carrier property. Since the low PAPR is advantageous for a user equipment (UE) in terms of transmission power efficiency, the SC-FDMA is adopted for uplink transmission in a 3rd generation partnership project (3GPP) long term evolution (LTE) as disclosed in section 5 of the 3GPP TS 36.211 V8.2.0 (2008-03) "Technical Specification Group Radio Access Network; Evolved Universal Terrestrial Radio Access (E-UTRA); Physical channels and modulation (Release 8)".

In a typical wireless communication system, one radio frequency (RF) is considered in general even if a bandwidth is differently set between an uplink and a downlink. The RF is used to upconvert a baseband signal. The RF may be referred to as another terminology, such as carrier frequency, center frequency, component carrier, etc. In the 3GPP LTE, the number of RFs constituting the uplink or the downlink is 1, and the bandwidth of the uplink is symmetrical to the bandwidth of the downlink. However, except for some areas of the world, it is difficult to allocate frequencies of wide bandwidths. As a technique for effectively using fragmented small RFs, a spectrum aggregation (also referred to as bandwidth aggregation or carrier aggregation) technique is being developed to obtain the same effect as when a frequency band of a logically wide bandwidth is used by aggregating a plurality of physically non-contiguous RFs in a frequency domain. The spectrum aggregation includes a technique for supporting a system bandwidth of 100 mega Hertz (MHz) by using multiple RFs even through, for example, the 3GPP LTE supports a bandwidth of up to 20 MHz, and a technique for allocating an asymmetric bandwidth between the uplink and the downlink. The multi-RF system is introduced to support an increasing throughput, to avoid cost increase due to the introduction of a broadband RF device, and to ensure compatibility with a legacy system.

Accordingly, there is a need for a method of effectively transmitting data in a multi-RF system.

DISCLOSURE OF INVENTION

Technical Problem

The present invention provides a method and an apparatus of transmitting data in a multi-radio frequency (RF) system.

Solution to Problem

In an aspect, a method of transmitting data in a multi-radio frequency (RF) system, carried in a user equipment (UE), is provided. The method includes transmitting first data through a first physical channel to a first base station (BS) and transmitting second data through a second physical channel to a second BS, wherein the first data and the second data are simultaneously transmitted.

Preferably, the first data is transmitted on a single carrier-frequency division multiple access (SC-FDMA) signal, and the second data is transmitted on an orthogonal frequency division multiple access (OFDMA) signal.

Preferably, the first data comprises information regarding the second BS, and the second data comprises information regarding the first BS.

Preferably, the method further includes receiving third data through a third physical channel from the first BS and transmitting interference information through the second physical channel to the second BS, wherein the interference information is information regarding interference generated for the third physical channel by the second BS.

Preferably, the third data is received on an OFDMA signal.

In another aspect, a method of transmitting data in a multi-RF system, carried in a UE, is provided. The method includes transmitting first data through a first physical channel to a first BS and transmitting second data through a second physical channel and third data through a third physical channel to a second BS, wherein the first data, the second data, and the third data are simultaneously transmitted.

Preferably, the transmitting of the first data includes generating a first frequency-domain symbol by performing discrete Fourier transform (DFT) on the first data, generating a first SC-FDMA signal by performing inverse fast Fourier transform (IFFT) on the first frequency-domain symbol, and transmitting the first SC-FDMA signal through the first physical channel, and the transmitting of the second data and the third data includes generating a second frequency-domain symbol by performing DFT on the second data and the third data, generating a second SC-FDMA signal by performing IFFT on the second frequency-domain symbol, and transmitting the second SC-FDMA signal through the second physical channel; and the third physical channel.

In still another aspect, a user equipment (UE) is provided. The UE includes a radio frequency (RF) unit transmitting and/or receiving a radio signal, and a processor coupled with the RF unit and configured to transmit first data through a first physical channel to a first BS and transmit second data through a second physical channel to a second BS, wherein the first data and the second data are simultaneously transmitted.

Advantageous Effects of Invention

A method and an apparatus of effectively transmitting data in a multi-radio frequency (RF) system can be provided.

MODE FOR THE INVENTION

Figure 1:
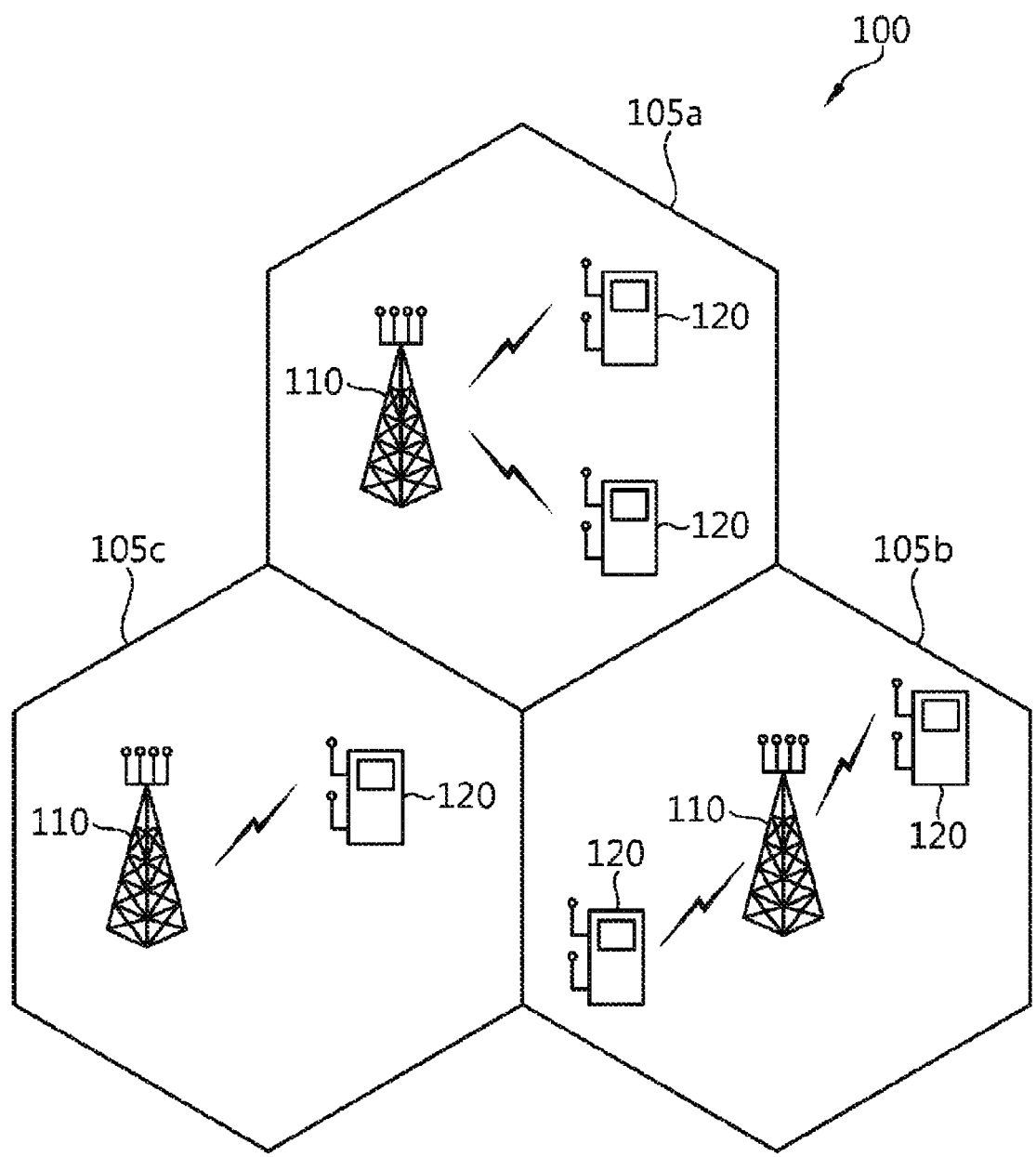
FIG. 1 is a block diagram showing a wireless communication system.

FIG. 1 is a block diagram showing a wireless communication system.

Referring to FIG. 1, a wireless communication system 100 includes at least one base station (BS) 110. The BSs 110 provide communication services with respect to specific geographical regions (generally referred to as cells) 105a, 105b, and 105c. Each cell can be divided into a plurality of regions (referred to as sectors). A user equipment (UE) 120 may be fixed or mobile, and may be referred to as another terminology, such as a mobile station (MS), a user terminal (UT), a subscriber station (SS), a wireless device, etc. The BS 110 is generally a fixed station that communicates with the UE 120 and may be referred to as another terminology, such as an evolved node-B (eNB), a base transceiver system (BTS), an access point, etc.

Hereinafter, downlink means communication from the BS 110 to the UE 120, and uplink means communication from the UE 120 to the BS 110. In downlink, a transmitter may be a part of the BS 110 and a receiver may be a part of the UE 120. In uplink, a transmitter may be a part of the UE 120 and a receiver may be a part of the BS 110.

The UE belongs to one cell. The cell to which the UE belongs is referred to as a serving cell. The BS which provides the serving cell with a communication service is referred to as a serving BS. The wireless communication system is a cellular system in which another cell is adjacent to the serving cell. The adjacent another cell is referred to as a neighboring cell.

The wireless communication system may be any one of a multiple-input multiple-output (MIMO) system, a multiple-input single-output (MISO) system, a single-input single-output (SISO) system, and a single-input multiple-output (SIMO) system. The MIMO system uses a plurality of transmit (Tx) antennas and a plurality of receive (Rx) antennas. The MISO system uses a plurality of Tx antennas and one Rx antenna. The SISO system uses one Tx antenna and one Rx antenna. The SIMO system uses one Tx antenna and a plurality of Rx antennas.

Hereinafter, the Tx antenna is a logical or physical antenna used to transmit one signal or one stream, and the Rx antenna is a logical or physical antenna used to receive one signal or one stream.

Figure 2:
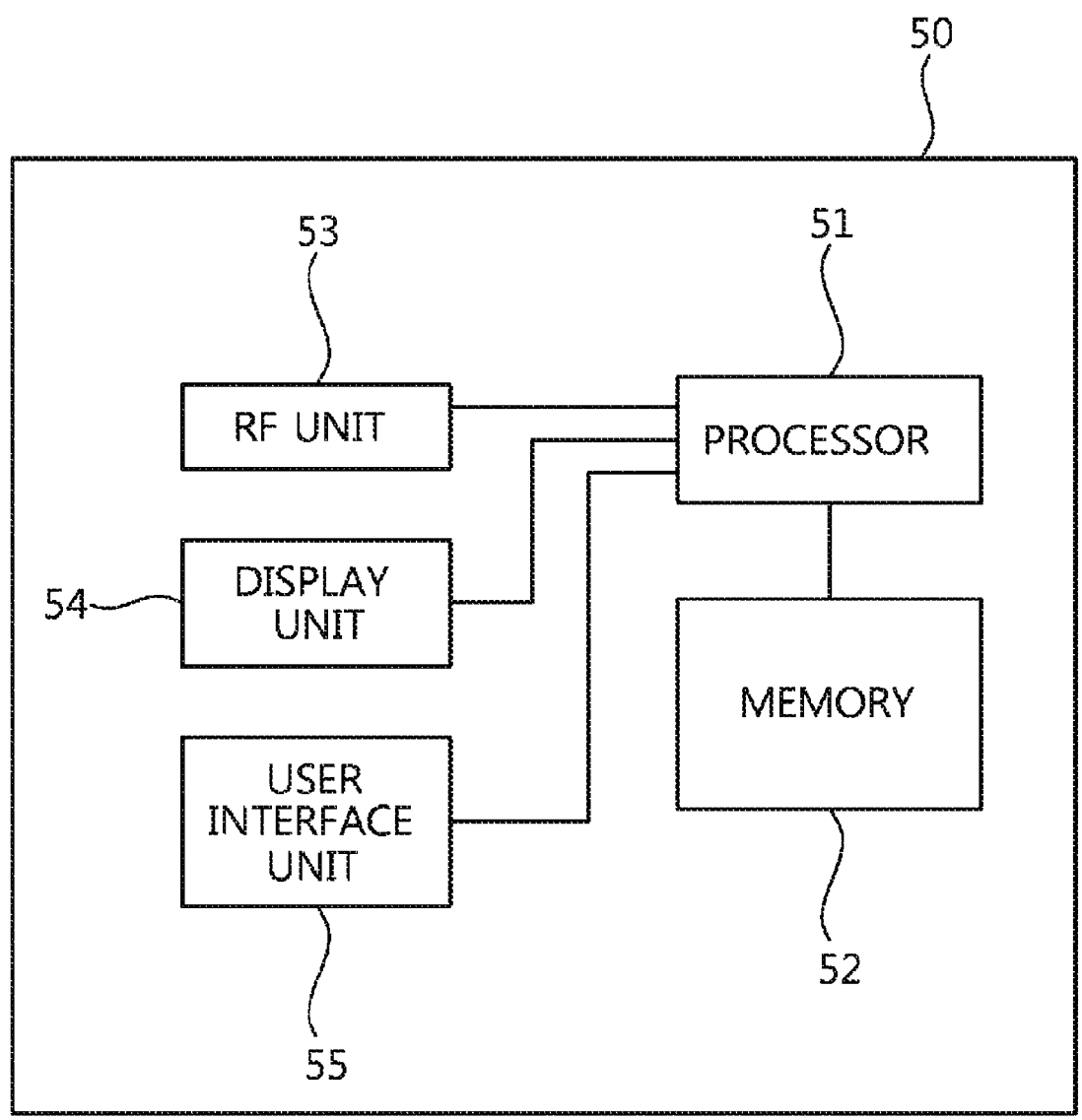
FIG. 2 is a block diagram showing an apparatus for a wireless communication.

FIG. 2 is a block diagram showing an apparatus for a wireless communication. The apparatus may be a part of a UE. An apparatus 50 includes a processor 51, a memory 52, a radio frequency (RF) unit 53, a display unit 54, and a user interface unit 55. The processor 51 may be configured to implement various operations, such as, data processing, MIMO processing, generation of a time-domain signal, etc. A process of transmitting/receiving data in a multi-RF system to be described below can be performed by the processor 51. The processor 51 may be configured to implement functions, procedures to be proposed below and/or methods described below in this description. Layers of the radio interface protocol may be implemented in the processor 51. The function of each layer can be implemented in the processor 51. The memory 52 is operatively coupled with the processor 51 and stores a variety of information to operate the processor 51 (e.g., an operating system, applications, and general files). The display unit 54 displays a variety of information of the apparatus 50 and may use a well-known element such as a liquid crystal display (LCD), an organic light emitting diode (OLED), etc. The user interface unit 55 can be configured with a combination of well-known user interfaces such as a keypad, a touch screen, etc. The RF unit 53 is operatively coupled with the processor 51 and transmits and/or receives radio signals.

The processor 51 may include application-specific integrated circuit (ASIC), other chipset, logic circuit and/or data processing device. The memories 52 may include read-only memory (ROM), random access memory (RAM), flash memory, memory card, storage medium and/or other storage device. The RF units 53 may include baseband circuitry to process radio frequency signals. When the embodiments are implemented in software, the techniques described herein can be implemented with modules (e.g., procedures, functions, and so on) that perform the functions described herein. The modules can be stored in memories 52 and executed by processor 51. The memories 52 can be implemented within the processor 51 or external to the processor 51 in which case those can be communicatively coupled to the processor 51 via various means as is known in the art.

Figure 3:
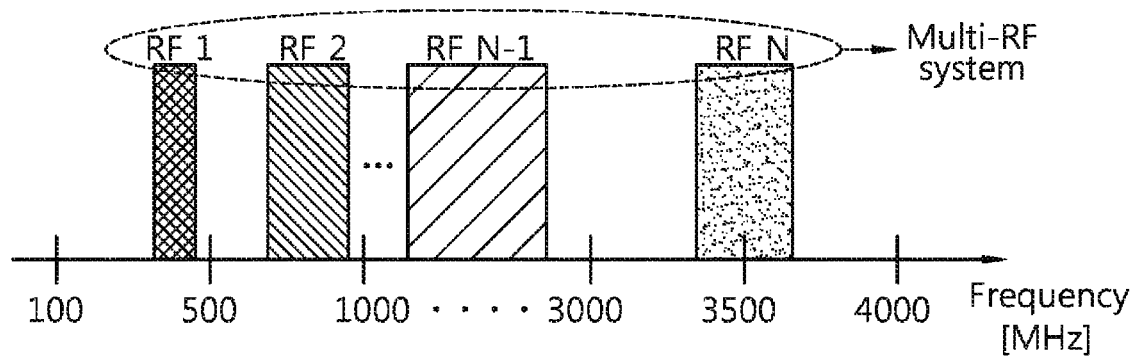
FIG. 3 shows the concept of a wireless communication system using multiple radio frequencies (RFs).

FIG. 3 shows the concept of a wireless communication system using multiple RFs.

Referring to FIG. 3, the wireless communication system using the multiple RFs uses N RFs (where N is a natural number greater than or equal to 2). In downlink, a BS concurrently can transmit data to one UE by using one or more RFs. In uplink, the UE can also transmit data to the BS by using one or more RFs.

Figure 4:
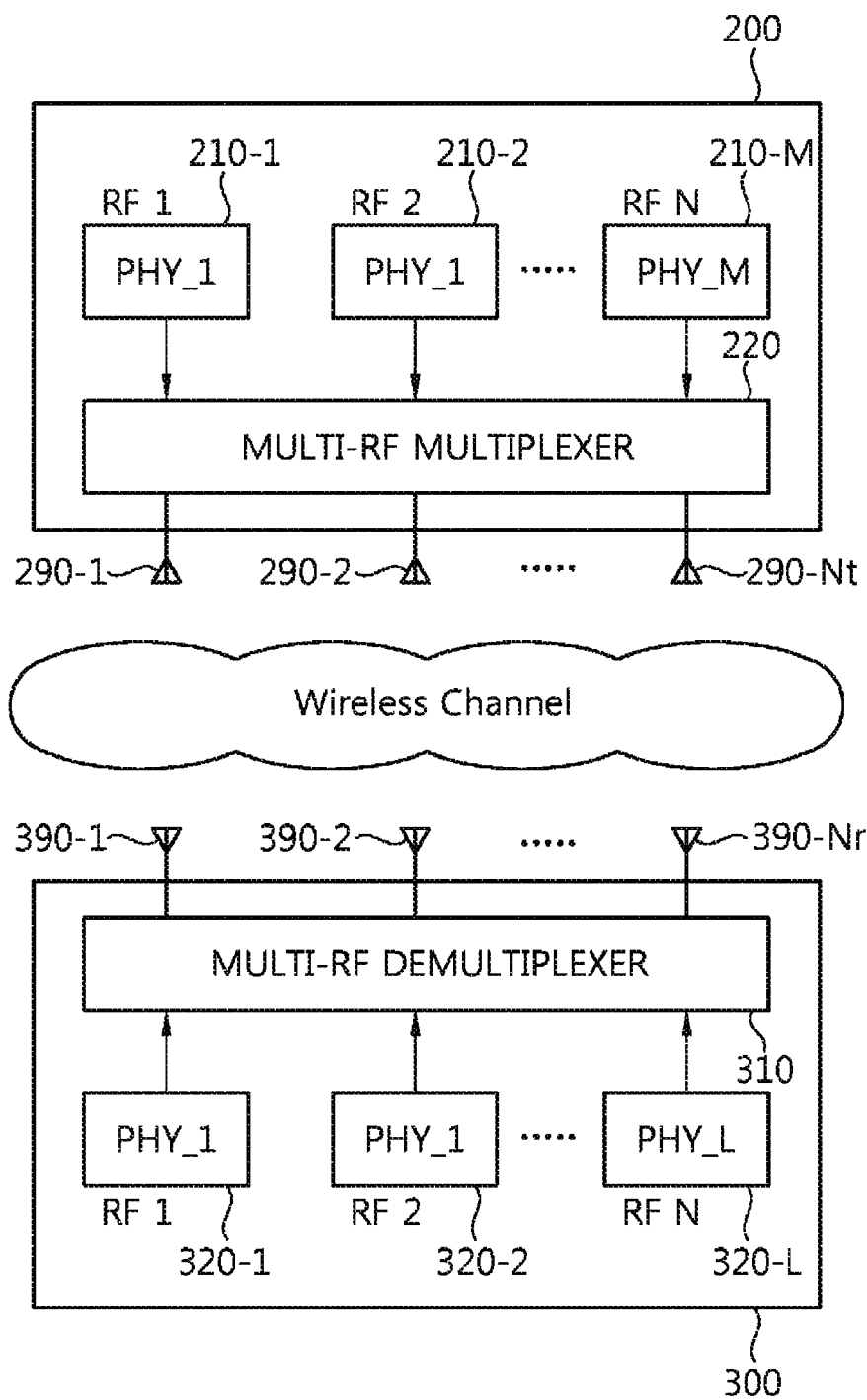
FIG. 4 shows an example of a transmitter and a receiver in a multi-RF system.

FIG. 4 shows an example of a transmitter and a receiver in a multi-RF system.

Referring to FIG. 4, each of a transmitter 200 and a receiver 300 of the multi-RF system uses N RFs. A wireless channel is established between the transmitter 200 and the receiver 300. In downlink, the transmitter 200 may be a part of a BS, and the receiver 300 may be a part of a UE. In uplink, the transmitter 200 may be a part of the UE, and the receiver 300 may be a part of the BS.

The transmitter 200 includes a plurality of physical channels (hereinafter, simply referred to as PHYs) 210-1, ..., 210-M, a multi-RF multiplexer 220, and a plurality of Tx antennas 290-1, ..., 290-Nt. In the transmitter 200, each RF has one or more PHYs. The receiver 300 includes a multi-RF demultiplexer 310, a plurality of PHYs 320-1, ..., 320-L, and a plurality of Rx antennas 390-1, ..., 390-Nr. In the receiver 300, each RF has one or more PHYs. The number M of PHYs of the transmitter 200 may be identical to or different from the number L of PHYs of the receiver 300.

Baseband signals are generated based on the M PHYs 210-1, ..., 210-M. The baseband signals are converted Tx radio signals based on N RFs. The multi-RF multiplexer 220 combines the Tx radio signals so that the Tx radio signals can be simultaneously transmitted on the M PHYs. The combined Tx radio signals are transmitted through the Nt Tx antennas 290-1, ..., 290-Nt. The Tx radio signals are received through the Nr Rx antennas 390-1, ..., 390-Nr of the receiver 300 through the wireless channel. The Rx radio signals are de-multiplexed by the multi-RF demultiplexer 310 so that the Rx radio signals are separated into the L PHYs 320-1, ..., 320-L. The PHYs 320-1, ..., 320-L recover the baseband signals.

All transmission/reception methods used in a wireless communication system using a single RF can also be applied to each PHY of the transmitter and the receiver in the multi-RF system. A plurality of RF communication modules can be configured when the wireless communication system using multiple RFs is configured. Alternatively, one RF module can be used to sequentially convert or recover baseband signals of several PHYs.

Figure 5:
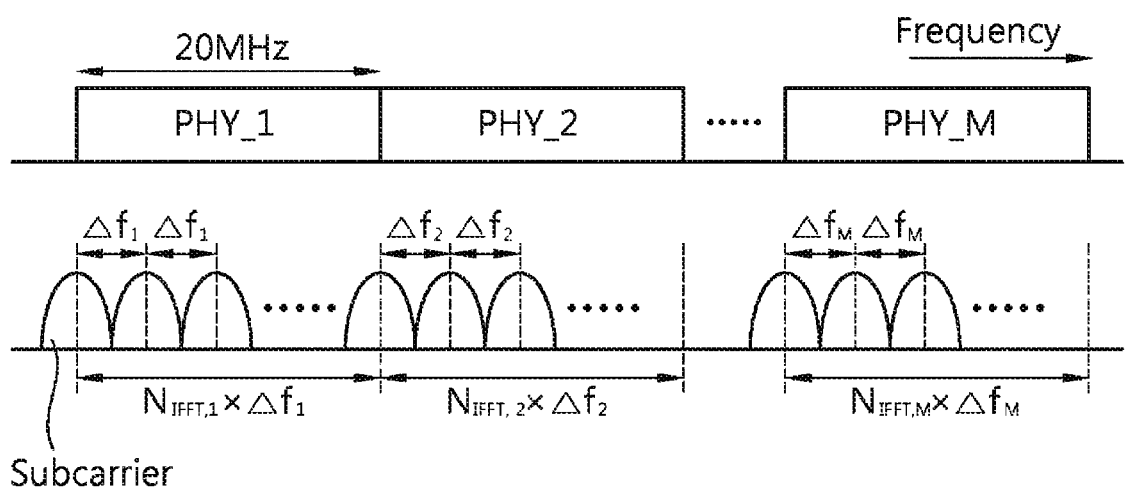
FIG. 5 shows an example of a plurality of physical channels.

FIG. 5 shows an example of a plurality of PHYs.

Referring to FIG. 5, N multiple RFs may consist of M PHYs having a specific bandwidth (BW). Among the M PHYs, an mth PHY (hereinafter, PHY_m) has a bandwidth of $N_{IFFT} \cdot \Delta f_m$ (where m=1, ..., M). Herein, $N_{IFFT,m}$ denotes an inverse fast Fourier transform (IFFT) size of the PHY_m, and Δfm denotes a subcarrier spacing of the PHY_m. The IFFT size and the subcarrier spacing may be different or identical for each PHY. The PHY_m has a center frequency $f_{c,m}$. The center frequency is also referred to as a carrier frequency. Center frequencies of the respective PHYs may be arranged with a regular interval or an irregular interval.

For example, if it is assumed that each PHY has a maximum bandwidth of 20 mega Hertz (MHz), and M is 5, then a full bandwidth of up to 100 MHz can be supported. However, according to a UE or a cell, each PHY may use a bandwidth narrower than a maximum bandwidth.

Figure 6:
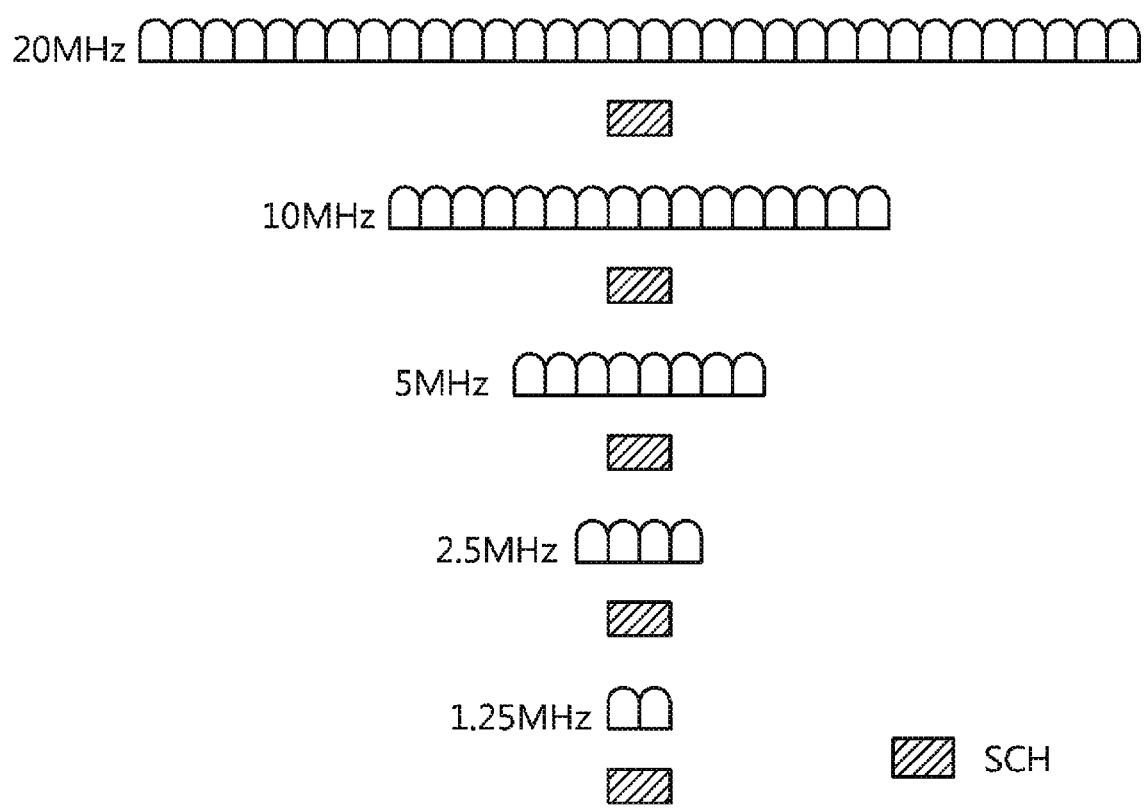
FIG. 6 shows an example of a bandwidth used by a physical channel.

FIG. 6 shows an example of a bandwidth used by a PHY.

Referring to FIG. 6, if it is assumed that a maximum bandwidth of the PHY is 20 MHz, the PHY can use a bandwidth (e.g., 10 MHz, 5 MHz, 2.5 MHz, or 1.25 MHz) narrower than the maximum bandwidth. Regardless of a bandwidth size used by the PHY in downlink, a synchronization channel (SCH) exists in the PHY. The SCH is a channel for cell search. The cell search is a procedure by which a UE acquires time synchronization and frequency synchronization with a cell. Since the SCH is located in all downlink PHYs, all UEs can be synchronized with the cell. In addition, if a plurality of downlink PHYs are allocated to the UE, cell search may be performed for each PHY or may be performed only for a specific PHY.

As such, a UE or a BS can transmit and/or receive data based on one or more PHYs in the multi-RF system. The number of PHYs used by the UE may be different from or equal to the number of PHYs used by the BS. In general, the BS can use M PHYs, and the UE can use L PHYs (M?L, where M and L are natural numbers). Herein, L may differ depending on a type of the UE.

Figure 7:
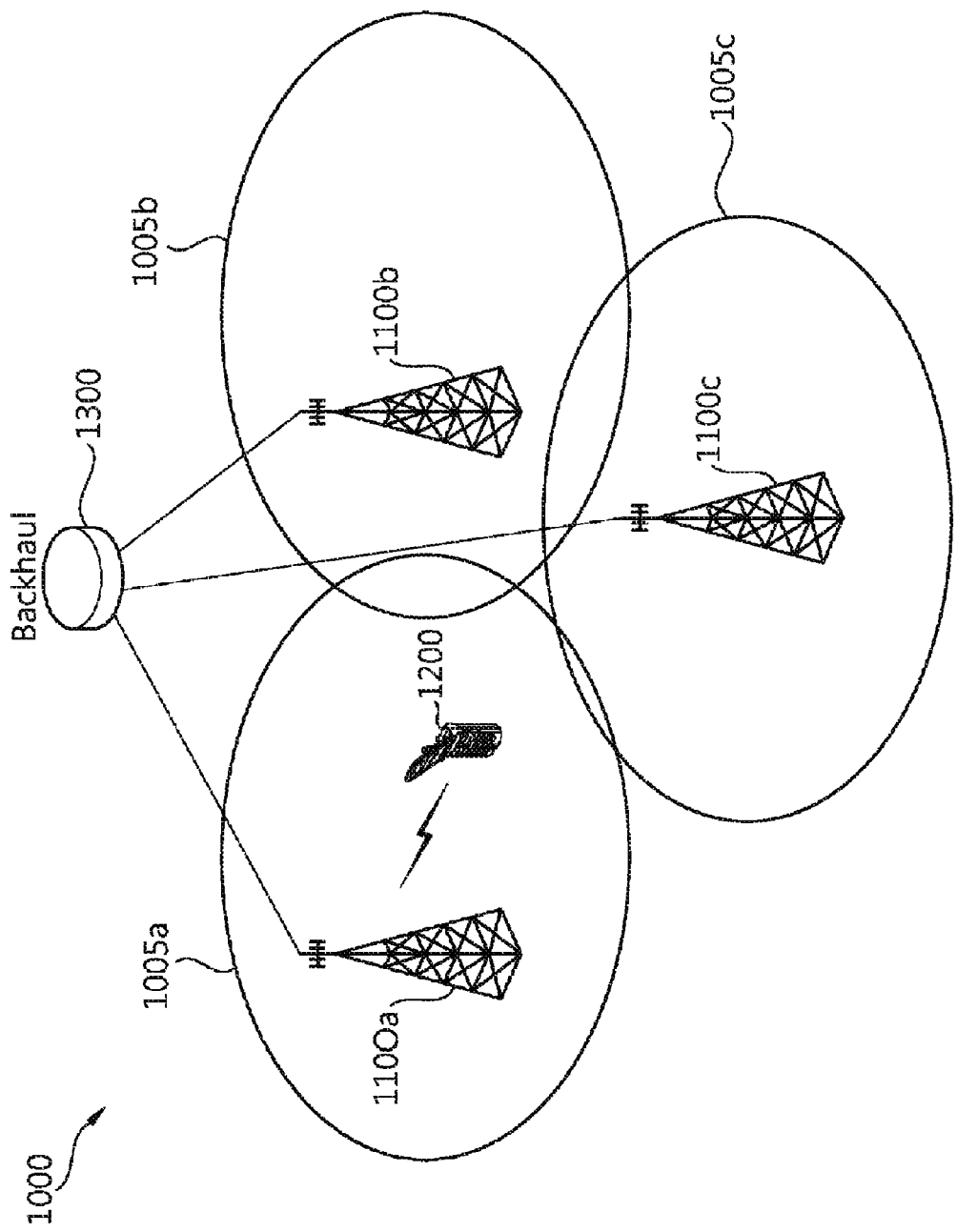
FIG. 7 shows an example of a multi-RF system.

FIG. 7 shows an example of a multi-RF system.

Referring to FIG. 7, a multi-RF system 1000 includes a plurality of BSs 1100a, 1100b, and 1100c, a UE 1200, and a backhaul 1300. The BSs 1100a, 1100b, and 1100c each have a plurality of PHYs (see FIG. 5). The plurality of PHYs can be used as uplink or downlink PHYs. A frequency reuse factor of the multi-RF system 1000 is 1, and the BSs 1100a, 1100b, and 1100c all use the same frequency band and may have the same number of PHYs. The backhaul 1300 allows the BSs 1100a, 1100b, and 1100c to share information one another. The BS-a 1100a provides a communication service for a cell-a 1005. The UE 1200 belongs to the cell-a 1005a, and transmits/receives data to/from the BS-a 1100a. One or several PHYs can be allocated to the UE 1200 for each of uplink and downlink. The cell-a 1005a is a serving cell, and other adjacent cells 1005b and 1005c are neighboring cells. When the UE 1200 moves to the neighboring cell 1005b or 1005c, a handover process is performed.

A multiple access method applicable to each of the uplink and the downlink includes orthogonal frequency division multiple access (OFDMA), single carrier-frequency division multiple access (SC-FDMA), etc. The SC-FDMA is also referred to as discrete fourier transform spread-orthogonal frequency division multiplexing (DFTS-OFDM). According to a channel condition of a UE, the OFDMA and the SC-FDMA can be both used as the multiple access method.

Figure 8:
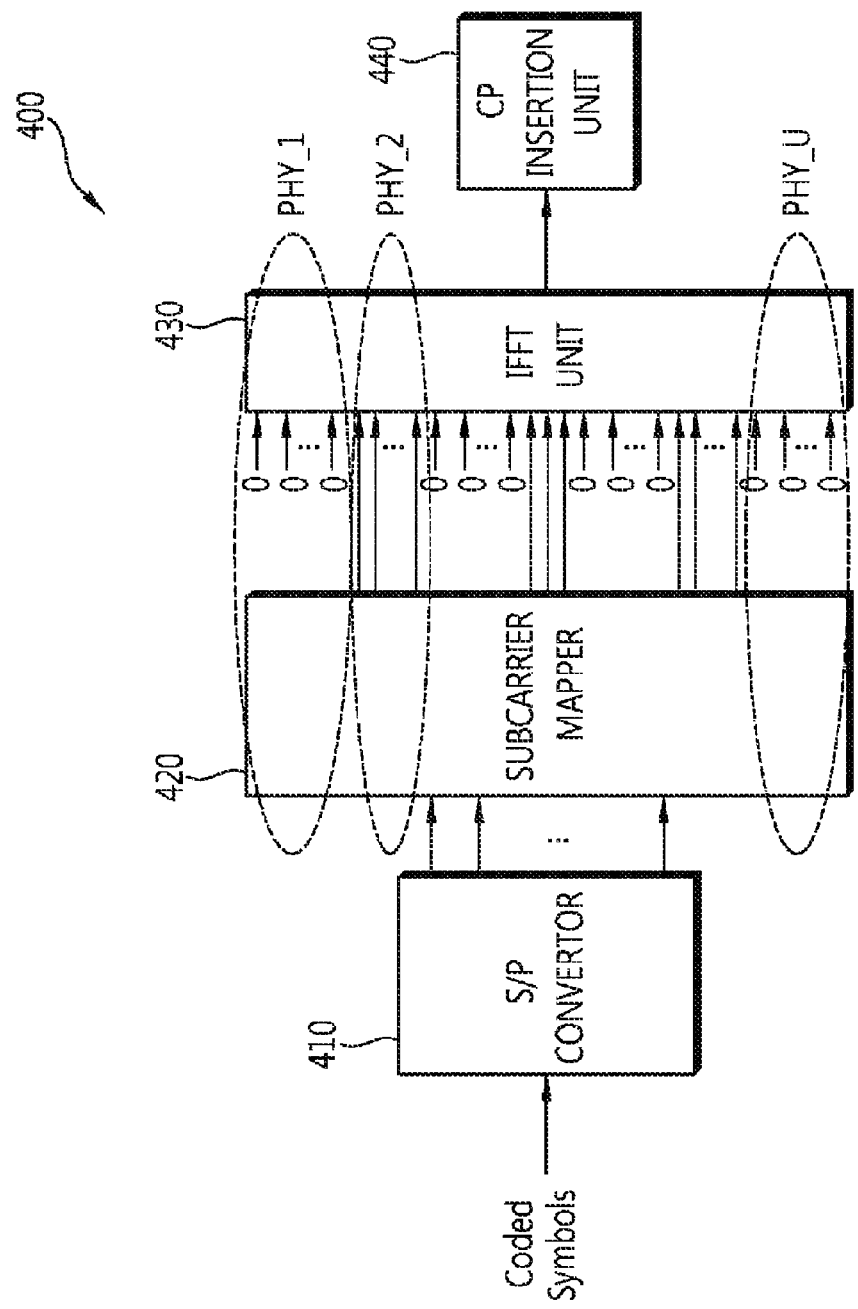
FIG. 8 is a block diagram showing an orthogonal frequency division multiple access (OFDMA) signal generator in a multi-RF system.

FIG. 8 is a block diagram showing an OFDMA signal generator in a multi-RF system.

Referring to FIG. 8, an OFDMA signal generator 400 includes a serial to parallel (S/P) converter 410, a subcarrier mapper 420, an IFFT unit 430, and a cyclic prefix (CP) insertion unit 440. Coded symbols can be generated by performing channel coding and/or modulation on information bits. The coded symbols are serially inputted to the S/P converter 410. The S/P converter 410 output the coded symbols parallel. The subcarrier mapper 420 maps the coded symbols to respective subcarriers, and properly inserts '0' to the subcarriers. The IFFT unit 430 performs IFFT on input symbols to output a time-domain OFDMA signal. The CP insertion unit 440 copies an end portion of the OFDMA signal and inserts the copied portion into a front portion of the OFDMA signal. Inter symbols interference (ISI) and inter carrier interference (ICI) are avoided by the CP insertion, and thus orthogonality can be maintained in a multi-path channel. The OFDMA signal is transmitted on each of PHYs (i.e., PHY_1, . . . , PHY_U). Instead of allocating resources to consecutive frequency bands, the OFDMA signal generator 400 can allocate the resources to only a specific frequency band having a good channel condition. Therefore, optimal channel-adaptive resource allocation can be achieved in a frequency selective channel.

However, an OFDMA scheme having a high peak-to-average power ratio (PAPR) is not suitable for a UE having limited power. In particular, the OFDMA scheme is not suitable for an UE located in a cell edge since maximum Rx power is limited.

Figure 9:
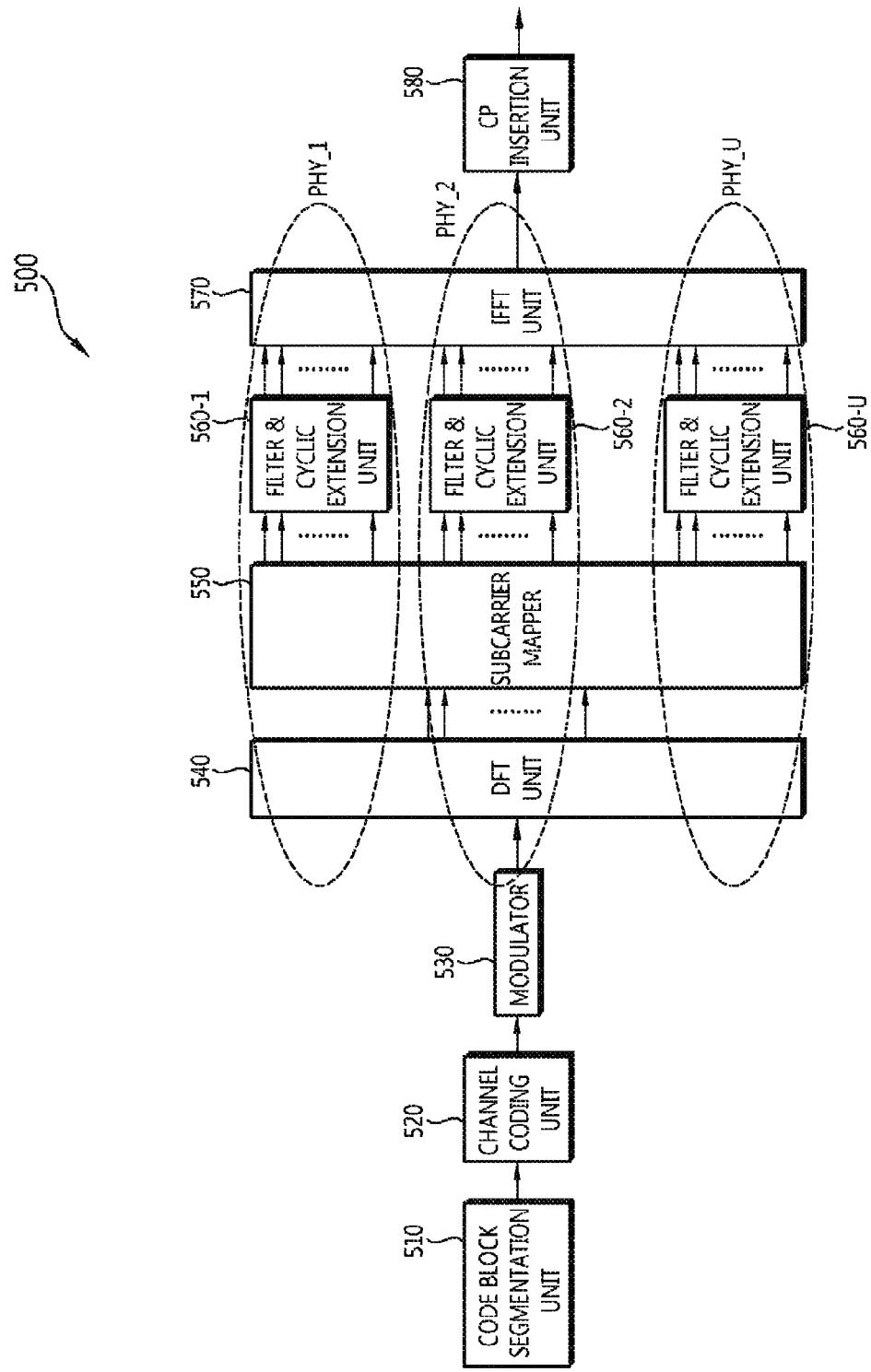
FIG. 9 is a block diagram showing a clustered single carrier-frequency division multiple access (SC-FDMA) signal generator in a multi-RF system.

FIG. 9 is a block diagram showing a clustered SC-FDMA signal generator in a multi-RF system.

Referring to FIG. 9, a clustered SC-FDMA signal generator 500 includes a code block segmentation unit 510, a channel coding unit 520, a modulator 530, a discrete Fourier transform (DFT) unit 540, a subcarrier mapper 550, a plurality of filter & cyclic extension units 560-1, . . . , 560-U, an IFFT unit 570, and a CP insertion unit 580. The code block segmentation unit 510 segments a bit stream into a code block. The bit stream may correspond to information bits. The channel coding unit 520 performs channel coding on the code block to generate coded bits. The modulator 530 maps the coded bits to a symbol that represents a location on a signal constellation. The DFT unit 540 performs DFT on an input symbol to output a frequency-domain symbol. The subcarrier mapper 550 maps the frequency-domain symbol to each subcarrier, and properly inserts '0' to each subcarrier. The filter & cyclic extension units 560-1, . . . , 560-U perform filtering and cyclic extension on symbols mapped to the subcarriers according to respective PHYs (i.e., PHY_1, . . . , PHY_U). The IFFT unit 570 performs IFFT on an input symbol to output a time-domain SC-FDMA signal. The CP insertion unit 580 copies an end portion of the SC-FDMA signal and inserts the copied portion into a front portion of the SC-FDMA signal. The SC-FDMA signal is transmitted on each of PHYs (i.e., PHY_1, . . . , PHY_U). Since IFFT is performed after DFT spreading, the SC-FDMA signal has a single carrier property and has a low PAPR in comparison with OFDM.

In the clustered SC-FDMA signal generator 500, a DFT size and an IFFT size are increased to fit an extended bandwidth size in a multi-RF system supporting the extended bandwidth. The DFT unit 540 performs DFT having a size corresponding to a full bandwidth. When using the clustered SC-FDMA signal generator 500, the PAPR can be decreased, but complexity of a transmitter may be significantly increased since the DFT size and the IFFT size are significantly increased.

Figure 10:
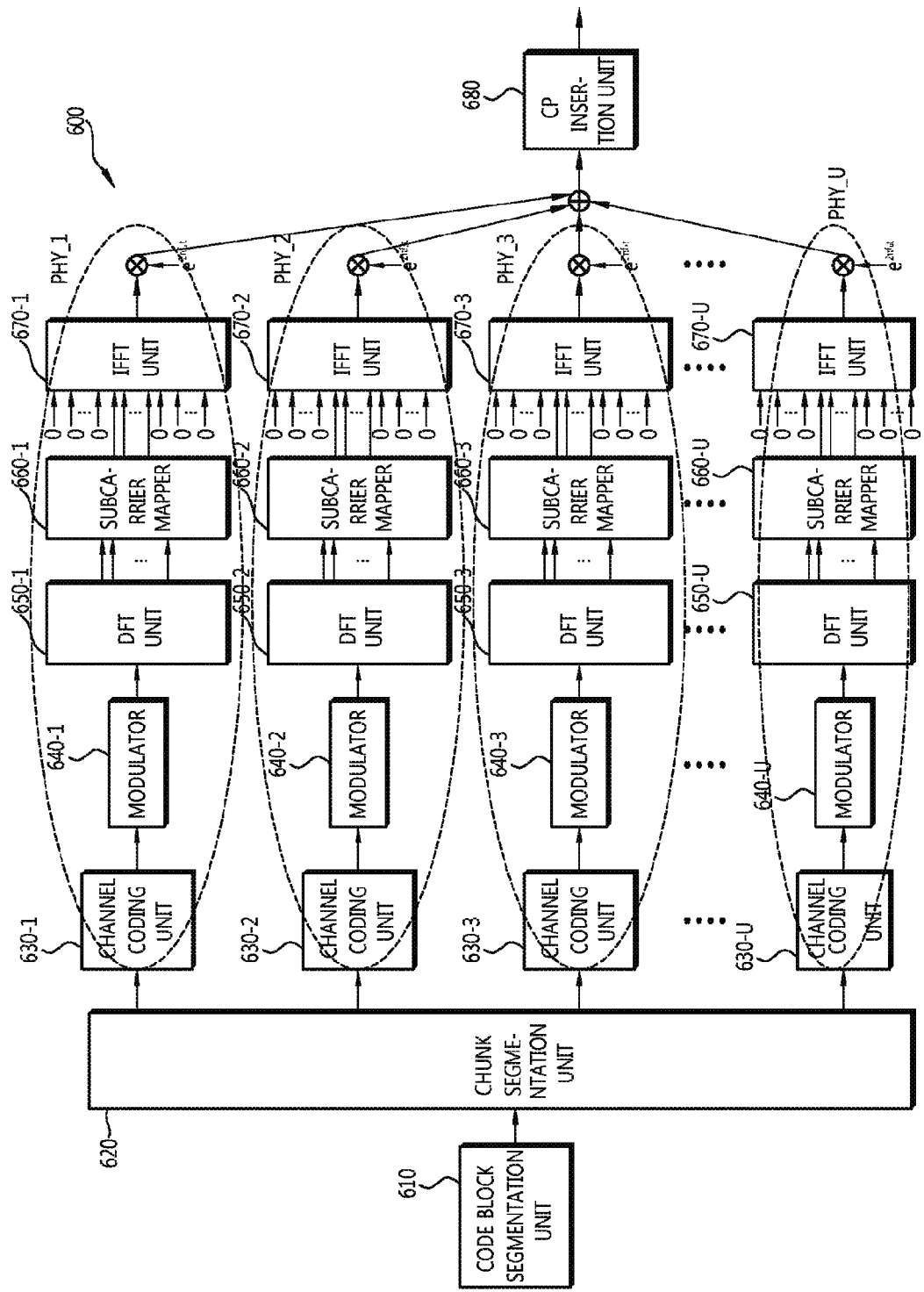
FIG. 10 is a block diagram showing an SC-FDMA signal generator for each physical channel in a multi-RF system.

FIG. 10 is a block diagram showing an SC-FDMA signal generator for each PHY in a multi-RF system.

Referring to FIG. 10, an SC-FDMA signal generator 600 includes a code block segmentation unit 610, a chunk segmentation unit 620, a plurality of channel coding units 630-1, . . . , 630-U, a plurality of modulators 640-1, . . . , 640-U, a plurality of DFT units 650-1, . . . , 650-U, a plurality of subcarrier mappers 660-1, . . . , 660-U, a plurality of IFFT units 670-1, . . . , 670-U, and a CP insertion unit 680. Herein, U denotes the number of PHYs allocated to a transmitter.

The SC-FDMA signal generator 600 generates U SC-FDMA signals by performing channel coding, DFT, subcarrier mapping, and IFFT for each of PHYs (PHY_1, . . . , PHY_U). Each of the SC-FDMA signals subjected to IFFT for each PHY is multiplied by a center frequency of each PHY, and thereafter the resultant SC-FDMA signals are added and then are inserted with a CP. The SC-FDMA signal generator 600 can allocate data independently for each PHY. Further, the SC-FDMA signal generator 600 can properly regulate complexity of the transmitter since a maximum DFT size is limited for one PHY. The SC-FDMA for each PHY is also referred to as chunk specific SC-FDMA or N×SC-FDMA.

The multi-RF system can have several types of uplink and downlink configurations. A frequency division duplex (FDD) system or a time division duplex (TDD) system may have an asymmetric structure in which an uplink bandwidth and a downlink bandwidth are different from each other. FDD implies that uplink transmission and downlink transmission are achieved at different frequency bands. TDD implies that uplink transmission and downlink transmission are achieved at different times.

In the FDD system or the TDD system, the uplink bandwidth and the downlink bandwidth can be designed to be identical to each other. In this case, the uplink and downlink may be configured to have a symmetric structure in which the same number of PHYs exist in both uplink and downlink transmissions or an asymmetric structure in which the number of PHY differs between uplink and downlink transmissions. In case of the asymmetric structure, a specific link may have a higher data throughput. If the uplink/downlink PHYs have the asymmetric structure in the multi-RF system, system optimization can be achieved in a flexible manner.

Figure 11:
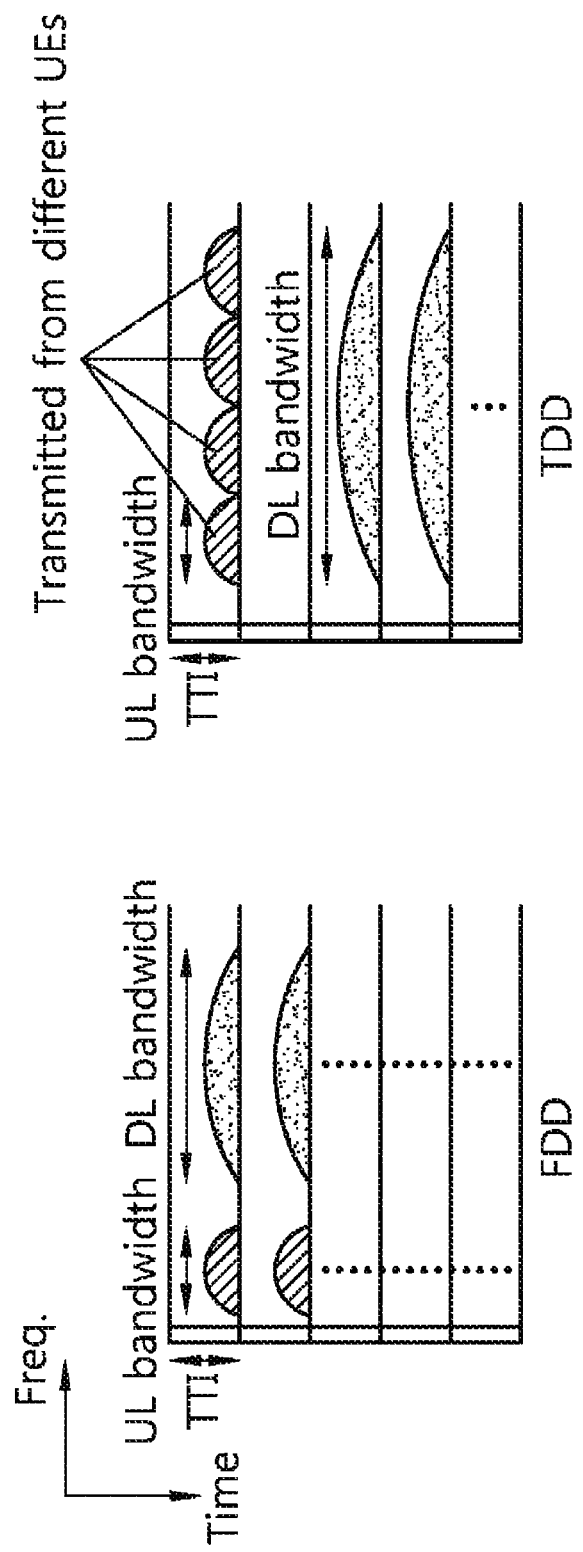
FIG. 11 shows an example in which uplink/downlink physical channels have an asymmetric structure when frequency division duplex (FDD) and time division duplex (TDD) are used in a multi-RF system.

FIG. 11 shows an example in which uplink/downlink PHYs have an asymmetric structure when FDD and TDD are used in a multi-RF system. A transmission time interval (TTI) is a scheduling unit for data transmission. Each of the FDD and the TDD has an asymmetric structure in which a downlink bandwidth is wider than an uplink bandwidth.

In a long term evolution (LTE) system using only one PHY, a subframe transmitted during a TTI consists of a plurality of OFDM symbols and a plurality of subcarriers. A maximum of three OFDM symbols located in a front portion of a subframe correspond to a control region to be assigned with a physical downlink control channel (PDCCH). The remaining OFDM symbols correspond to a data region to be assigned with a physical downlink shared channel (PDSCH). A UE can read downlink data information transmitted on the PDSCH by decoding downlink control information transmitted on the PDCCH.

Figure 12:
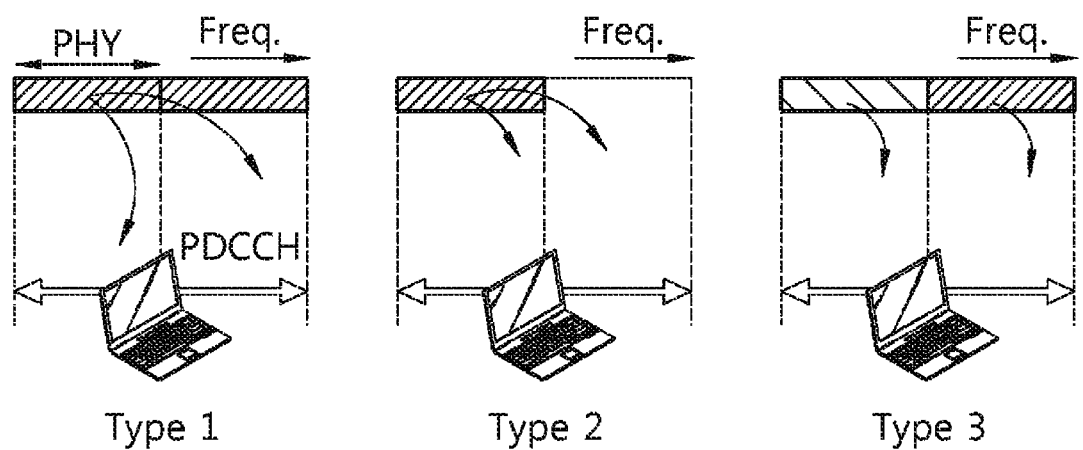
FIG. 12 shows an exemplary structure of a physical downlink control channel (PDCCH) in a multi-RF system.

FIG. 12 shows an exemplary structure of a PDCCH in a multi-RF system.

Referring to FIG. 12, several downlink PHYs are allocated to a UE. In a type 1, a control region to which the PDCCH is allocated is distributed throughout several PHYs. The UE can read downlink data information transmitted through the several PHYs by decoding downlink control information transmitted through the PDCCH. The type 1 can obtain a diversity gain since the PDCCH is distributed throughout the several PHYs. However, if a specific PHY has a bad channel condition, the PDCCH transmitted through the specific PHY may be undetectable. In this case, the downlink data information cannot be received.

A type 2 uses a control region to which only a specific PHY is allocated among the several PHYs. The UE can read not only downlink data information transmitted through the specific PHY but also downlink data information transmitted through another PHY by decoding control information transmitted through the PDCCH. The type 2 can minimize an amount of the downlink control information. However, when the specific PHY has a bad channel condition, data information existing in another PHY may also be undetectable.

A type 3 uses an independent control region for each of a plurality of PHYs. A PDCCH that carries control information for data information transmitted through each PHY is allocated to each control region. That is, the UE can read downlink data information transmitted through a PHY_L by decoding control information transmitted through a PDCCH that is transmitted through the PHY_L. The type 3 can receive data of another PHY even if a specific PHY has a bad channel condition. Accordingly, a system has a robust characteristic. However, when the same control information is repeated in every PHY, an unnecessary overhead may be generated.

When one or more uplink/downlink PHYs are allocated to one UE in the multi-RF system, all PHYs may be controlled by one cell to transmit/receive data. Each PHY has an almost independent channel environment in a multi-cell environment, and thus it is ineffective to allow one cell to control all PHYs since it disables optimal resource allocation. Further, when the UE uses multi-cell cooperative system optimization in which data is transmitted/received simultaneously with respect to a plurality of BSs, an overhead of control information for inter-cell cooperation is significantly increased. Furthermore, a great delay may occur since data fed back from the UE is transmitted to a corresponding BS via other BSs. The occurrence of the great delay may result in a problem in that a channel change cannot be handled.

A method of transmitting/receiving data by a UE simultaneously with respect to a plurality of BSs through a plurality of PHYs when one or more uplink/downlink PHYs are allocated to the UE in a multi-cell environment will be described. In addition, a method of transmitting/receiving control information effective for configuration of a multi-cell cooperative system will be described. In the following description, cells or BSs may be differentiated in accordance with location. Alternatively, cells or BSs may be differentiated in accordance with a type of sector while the cells or the BSs are located in the same position.

(1) a Method of Configuring an Uplink System for Allocating a Plurality of PHYs in a Multi-Cell Environment In this method, one or more BSs allocate a plurality of downlink PHYs and/or uplink PHYs to a UE so that the UE transmits/receives data to/from the one or more BSs at the same time. Since an SCH is located in each downlink PHY, the UE can perform cell search for each PHY. The UE can access the plurality of BSs for each PHY having a good channel condition. A handover can be easily performed since the UE can access the plurality of BSs.

To apply this method, it is required that the UE can be constructed of both an SC-FDMA signal generator and an OFDMA signal generator in accordance with each uplink PHY. In addition, it is also required that the UE can be constructed of an SC-FDMA signal generator having a combined structure of a clustered SC-FDMA signal generator (see FIG. 9) and an SC-FDMA signal generator for each PHY (see FIG. 10) in accordance with each BS.

Figure 13:
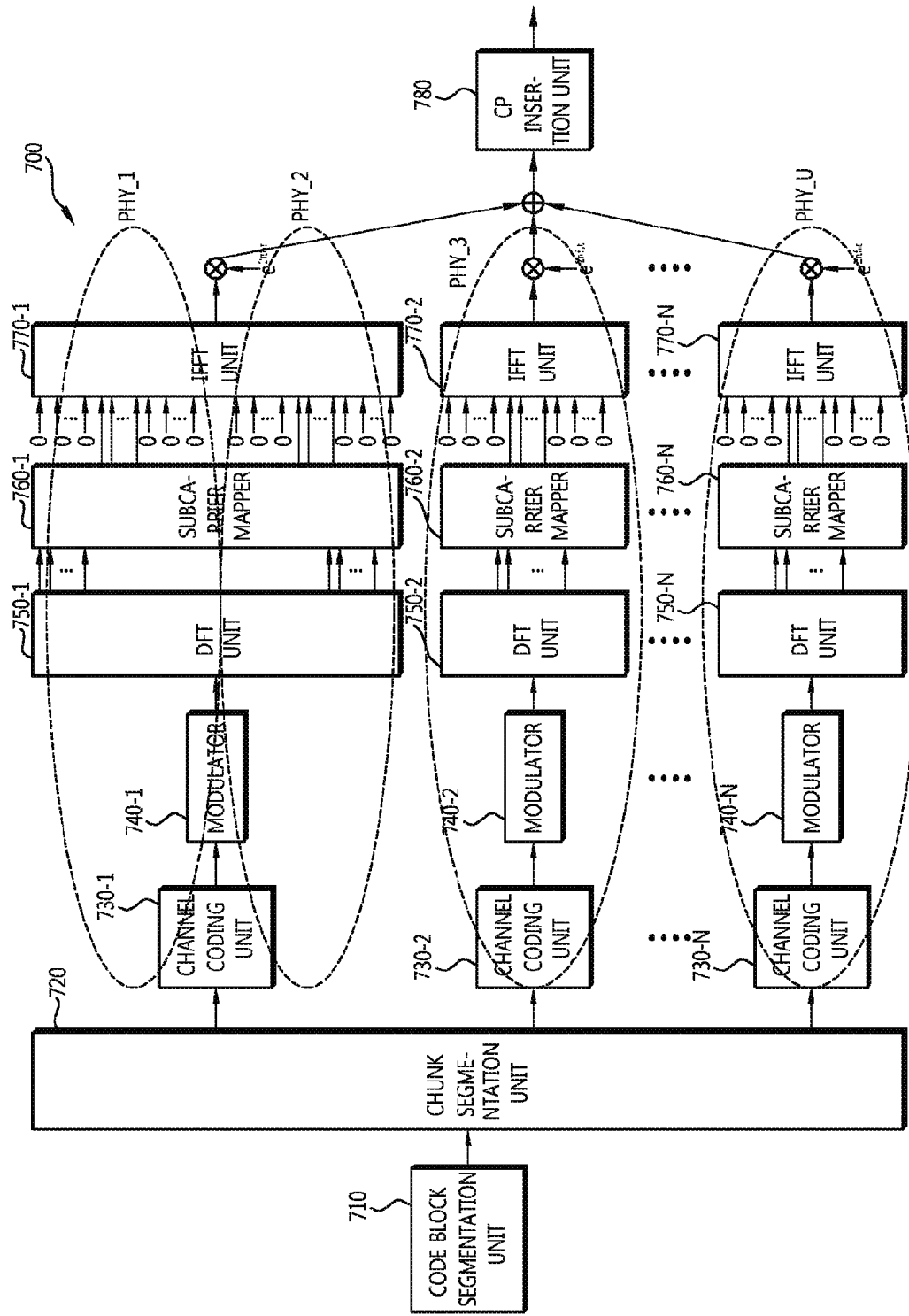
FIG. 13 is a block diagram showing an SC-FDMA signal generator having a structure in which a clustered SC-FDMA and an SC-FDMA for each physical channel are combined.

FIG. 13 is a block diagram showing an SC-FDMA signal generator having a structure in which a clustered SC-FDMA and an SC-FDMA for each PHY are combined.

Referring to FIG. 13, an SC-FDMA signal generator 700 includes a code block segmentation unit 710, a chunk segmentation unit 720, a plurality of channel coding units 730-1, . . . , 730-N, a plurality of modulators 740-1, . . . , 740-N, a plurality of DFT units 750-1, . . . , 750-N, a plurality of subcarrier mappers 760-1, . . . , 760-N, a plurality of IFFT units 770-1, . . . , 770-N, and a CP insertion unit 780.

A PHY_1 and a PHY_2 have a format of clustered SC-FDMA with a 1st DFT unit 750-1. A PHY_3 and a PHY_U each have a format of an SC-FDMA for each PHY, and in this format, one PHY has an independent DFT unit. DFT is performed for each BS. For example, the PHY_1 and the PHY_2 are PHYs that transmit/receive data to/from the same BS. The remaining PHYs having independent DFT units may be PHYs that transmit/receive data to/from different BSs. Alternatively, the remaining PHYs having independent DFT units may be PHYs that transmit/receive data to/from one or more BSs which use an SC-FDMA for each PHY. As such, the SC-FDMA signal generator 700 allows one UE to be able to transmit data simultaneously to a BS using a clustered SC-FDMA and a BS using an SC-FDMA for each PHY.

Figure 14:
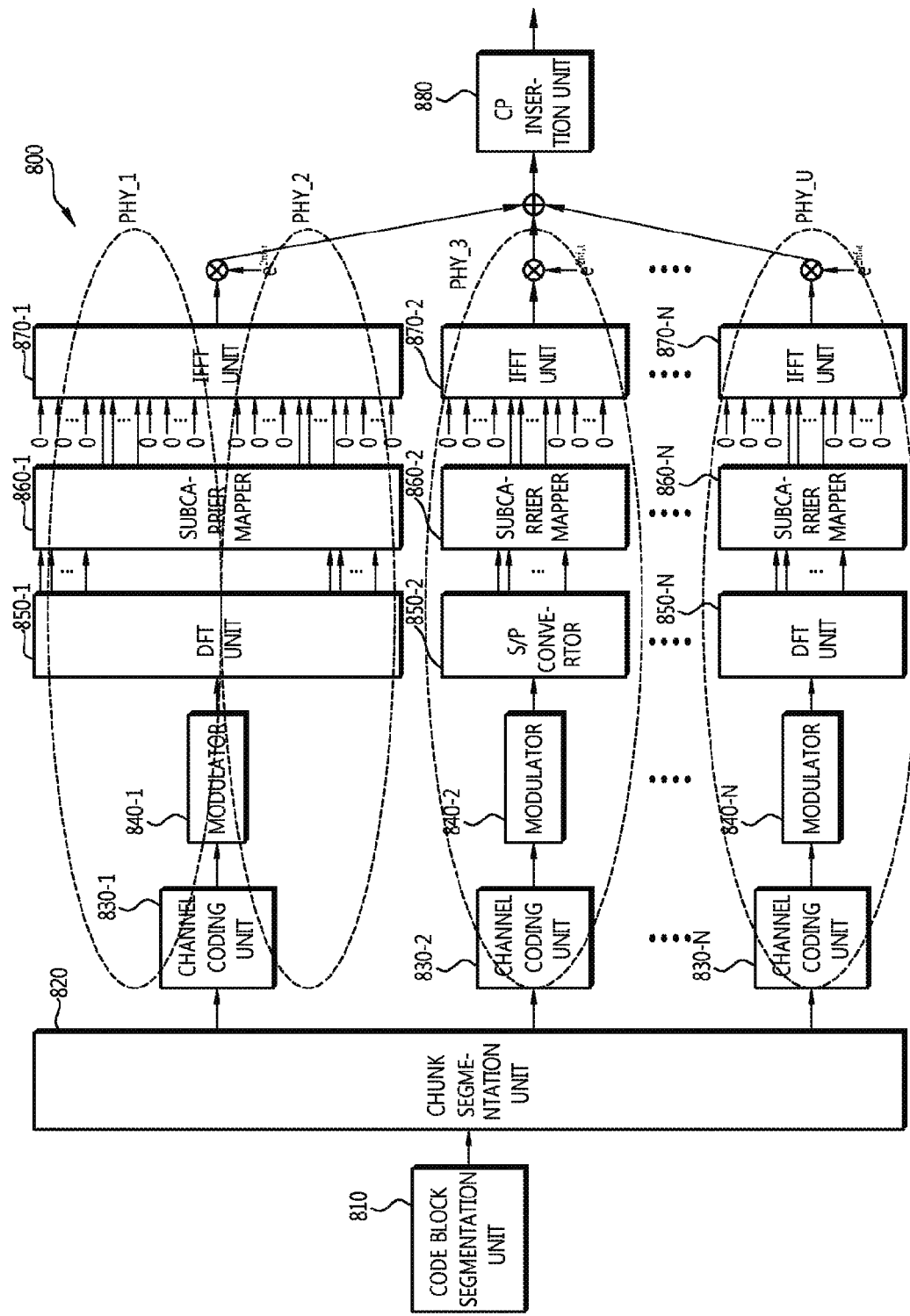
FIG. 14 is a block diagram showing a signal generator in which a specific physical channel uses OFDMA.

FIG. 14 is a block diagram showing a signal generator in which a specific PHY uses OFDMA. A signal generator 800 of FIG. 14 has a structure in which the SC-FDMA signal generator of FIG. 13 is combined with the OFDMA signal generator 400 of FIG. 8.

Referring to FIG. 14, a PHY_1 and a PHY_2 may be PHYs that transmit data to a BS using a clustered SC-FDMA scheme. A PHY_3 may a PHY that transmits data to a BS using an OFDMA scheme. A PHY_U may be a PHY that transmits data to a BS using an SC-FDMA scheme for each PHY.

Although FIG. 14 shows a signal generator based on the clustered SC-FDMA, the SC-FDMA for each PHY, and the OFDMA, the signal generator may be constructed with only a specific combination. Examples of the combination include: A) a signal generator based on the clustered SC-FDMA and the SC-FDMA for each PHY; B) a signal generator based on the clustered SC-FDMA and the OFDMA; and C) a signal generator based on the SC-FDMA for each PHY and the OFDMA. The combination A, B, or C may be configured if the signal generator is constructed as shown in FIG. 14, and one of the combination A, B, or C is used at a specific time.

Figure 15:
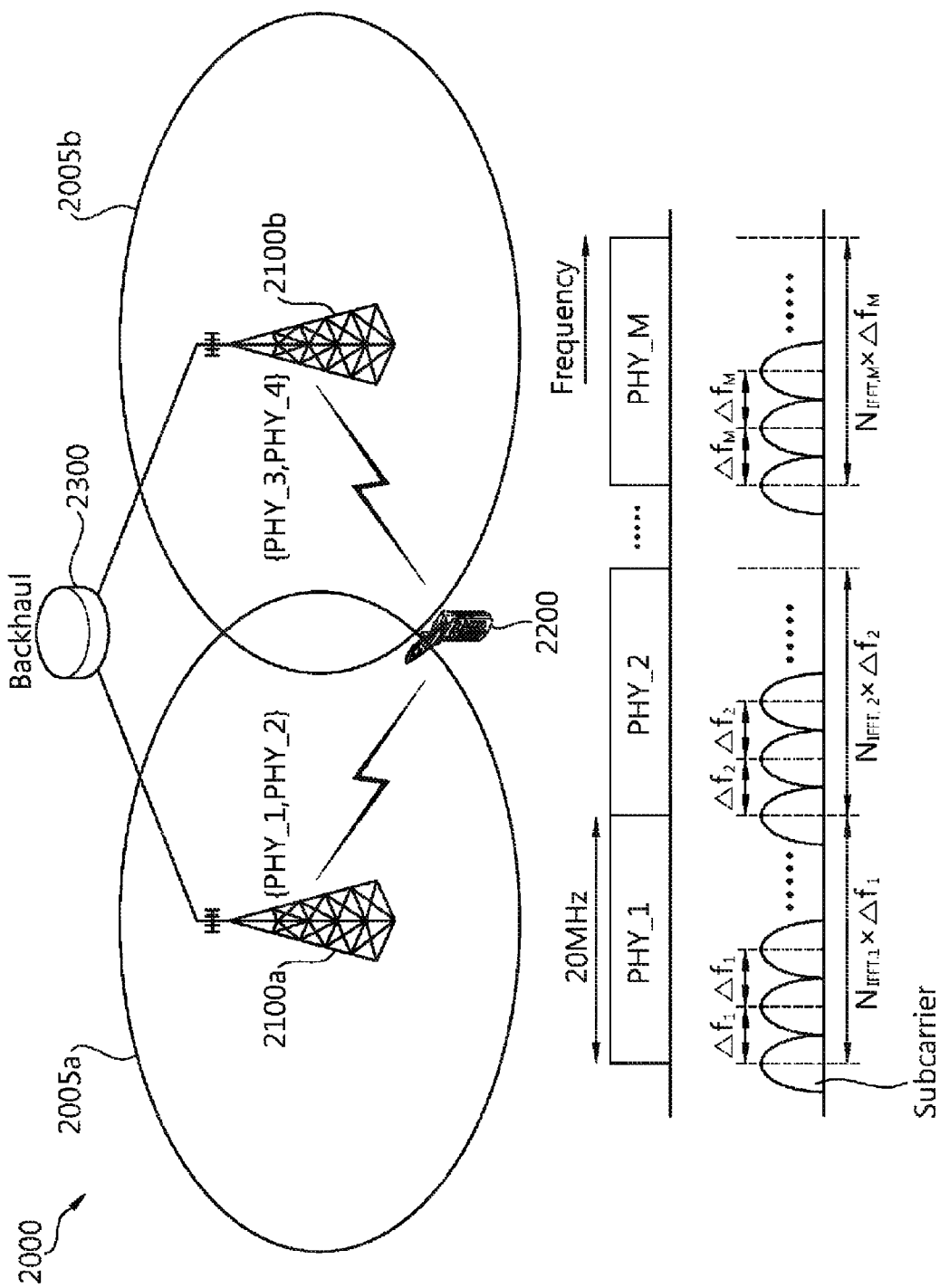
FIG. 15 shows an example in which a user equipment uses 4 physical channels in a multi-RF system.

(2) a Method of Obtaining Macro Diversity by Allocating a Plurality of PHYs in a Multi-Cell Environment FIG. 15 shows an example in which a UE uses 4 PHYs in a multi-RF system. Referring to FIG. 15, a UE 2200 uses 4 PHYs (i.e., PHY_1, PHY_2, PHY_3, PHY_4). {PHY_X, PHY_Y} are PHYs allocated to the UE by a BS. A BS-a 2100a allocates the PHY_1 and the PHY_2 to the UE. A BS-b 2100b allocates the PHY_3 and the PHY_4 to the UE. The UE can transmit/receive data to/from the two BSs 2100a and 2100b at the same time.

When using an FDD system, {PHY_X, PHY_Y} may be both downlink PHYs or uplink PHYs. Alternatively, one of them may be a downlink PHY, and the other may be an uplink PHY. More specifically, a method of allocating an uplink PHY (UL_PHY) and a downlink PHY (DL_PHY) by a BS to a UE in a multi-RF system may be used in 9 cases as shown in the following table.

TABLE 1

|  | Multiple UL_PHY | Single UL_PHY | No UL_PHY |
|---|---|---|---|
| Multiple DL_PHY | Case 1 | Case 2 | Case 3 |
| Single DL_PHY | Case 4 | Case 5 | Case 6 |
| No DL_PHY | Case 7 | Case 8 | Case 9 |

For example, if each of a BS-a and a BS-b allocates uplink/downlink PHYs to a UE in Case 5, the UE can transmit/receive data to/from the BS-a and the BS-b at the same time. In another example, if the BS-a allocates an uplink/downlink PHY to the UE in Case 1 and the BS-b allocates an uplink/downlink PHY to the UE in Case 9, the BS-a allocates all uplink/downlink PHYs. In this case, the UE can transmit/receive data to/from only the BS-a. A PHY used by the UE may be determined by the UE or the BS.

The multi-RF system can additionally configure a common PHY. The common PHY is a PHY used by one or more BSs for one UE at the same time. For example, it is assumed that one UE uses 3 PHYs. The BS-a transmits control information (e.g., {BS-a: PHY_1, PHY_2}) indicating that the PHY_1 and the PHY_2 are allocated to the UE. The BS-b transmits control information (e.g., {BS-b: PHY_2, PHY_3}) indicating that the PHY_2 and the PHY_3 are allocated to the UE. In this case, the PHY_2 is a common PHY. The BS-a and the BS-b can transmit data simultaneously to the UE through the PHY_2. If one UE transmits/receives data to/from a plurality BSs at the same time, a macro diversity gain based on the plurality of BSs can be easily obtained. For example, if a channel condition of the PHY_1 and the PHY_2 which are used to transmit/receive data to/from the BS-a is rapidly decreased, the data can be transmitted/received through a PHY_3. The common PHY can be used for retransmission based on hybrid automatic repeat request (HARQ). In addition, the common PHY can also be used for a voice over Internet protocol (VoIP) requiring high reliability.

The UE can receive the same data simultaneously from two BSs through different PHYs. In addition, the two BSs can simultaneously transmit data through a common PHY. The two BSs can simultaneously transmit the same data by using identical or different resources. In this case, RF combining or soft combining can be used.

(3) a Method of Cancelling Multi-Cell Interference by Allocating a Plurality of PHYs in a Multi-Cell Environment When a plurality of BSs allocate a plurality of PHYs to one UE, the UE can transmit/receive data to/from the plurality of BSs at the same time. Information regarding interference generated between the BSs may be reported to each BS to effectively decrease an amount of inter-cell interference.

For example, it is assumed that the wireless communication system of FIG. 15 is an FDD system. It is also assumed that the BS-a 2100*a* allocates the PHY_1 as a downlink channel to the UE 2200 and allocates the PHY_2 as an uplink channel to the UE 2200, and the BS-b 2100*b* allocates the PHY_3 as a downlink channel to the UE 2200 and allocates the PHY_4 as an uplink channel to the UE 2200. The UE 2200 uses uplink/downlink channels for both of the two adjacent BSs. In this case, if a full frequency band used by the BS-a 2100*a* is identical to that used by the BS-b 2100*b*, the PHY_1 used by the BS-b 2100*b* may generate interference to downlink data received by the UE 2200 from the BS-a 2100*a*. The UE 2200 can feed back information to the BS-b 2100*b* by using a feedback channel, wherein the information is in regard to interference generated for the PHY_1 by the BS-b 2100*b*. The feedback channel can use the PHY_4 that is an uplink PHY allocated by the BS-b 2100*b*. The BS-b 2100*b* can control interference by using feedback information transmitted from the UE 2200.

Examples of the information regarding interference and fed back from the UE include information regarding pre-coding that generates great interference, a location of resources allocated to the UE, spatial location information of the UE, information regarding power control that can regulate an amount of interference, a transmission scheme used by the UE, etc. The UE can combine one or a plurality of pieces of the information regarding interference, and then can feed back the combined information.

Figure 16:
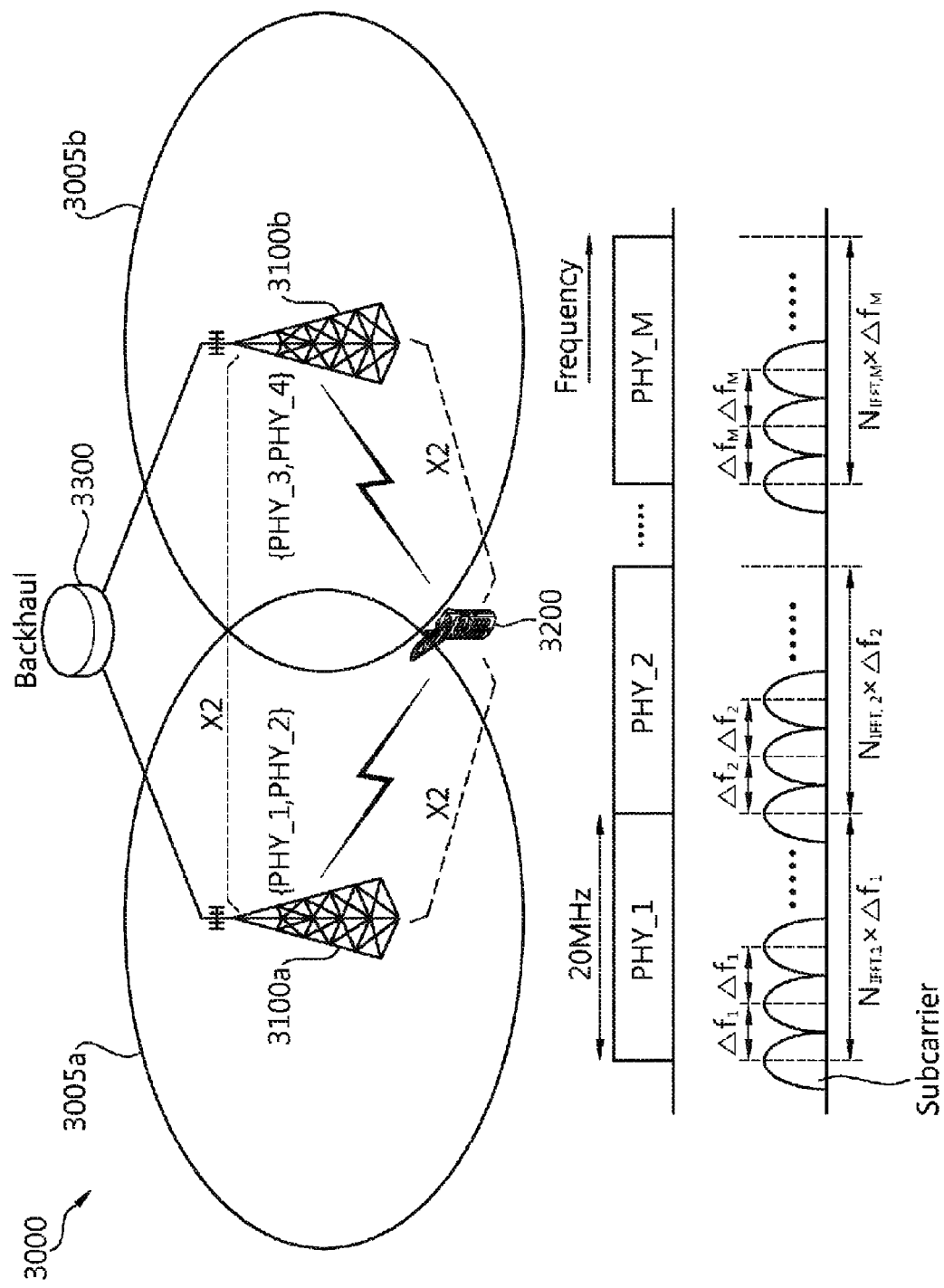
FIG. 16 shows a method of configuring a cooperative multi-cell system by allocating a plurality of physical channels in a multi-cell environment.

(4) a Method of Configuring a Cooperative Multi-Cell System by Allocating a Plurality of PHYs in a Multi-Cell Environment FIG. 16 shows a method of configuring a cooperative multi-cell system by allocating a plurality of PHYs in a multi-cell environment.

Referring to FIG. 16, BSs 3100*a* and 3100*b* each can share information between the BSs 3100*a* and 3100*b* via a backhaul 3300. The BSs 3100*a* and 3100*b* each can share information indicating a specific BS to which each PHY used by a UE 3200 is allocated via the backhaul 3300. If multiple cells or multiple BSs are constructed of different sectors or different forms while the multiple cells or the multiple BSs are located in the same position, the backhaul may consist of a specific channel internally constructed in the cells or the BSs. In addition, the BSs 3100*a* and 3100*b* each can share information between the BSs 3100*a* and 3100*b* through an X2 interface. The BSs 3100*a* and 3100*b* can be interconnected through the X2 interface. In this case, the BSs 3100*a* and 3100*b* can be connected through the X2 interface by means of the UE 3200. The X2 interface coupled with the BSs 3100*a* and 3100*b* and the UE 3200 can be equipped as a channel for controlling a cluster constructed between neighboring cells. A delay problem of the X2 interface can be solved by configuring the X2 interface by means of the UE. In addition, the UE 3200 can allow the BSs 3100*a* and 3100*b* to share information between the BSs 3100*a* and 3100*b* through respective uplink channels.

The UE 3200 can be replaced with a relay station, a repeater, a femtocell, etc. The part of the femtocell can perform the role of a BS.

As such, reliability of wireless communication can be increased by sharing information between BSs. For example, if errors occur continuously in an uplink channel of a specific BS, another BS transmits data to a UE to configure a highly reliable uplink system.

(5) Soft Handover by Allocating a Plurality of PHYs in a Multi-Cell Environment

In general, if a UE is moved to a BS-b while receiving a packet A from a BS-a, the BS-a cannot transmit the packet A to the UE. Therefore, the BS-b retransmits the packet A to the UE after a handover process. There is a need for a method capable of maintaining data communication if a UE is moved to a neighboring cell in case of which a plurality of BSs allocate a plurality of PHYs to the UE.

For example, it is assumed that the BS-a allocates a PHY_1 as a downlink channel to the UE, the BS-b allocates a PHY_3 as a downlink channel to the UE, and the UE transmits/receives data to/from the BSs at the same time. In addition, it is also assumed that the UE receives the packet A from the BS-a through the PHY_1. If the UE is moved to the BS-b during the packet A is received, the BS-b can transmit the packet A through the PHY_3. In this case, the BS-b can transmit the packet A through the PHY_3 by using the following methods.

First, a piggyback method can be used. If the BS-b transmits a packet A, the BS-b can convert the packet A into a format of a packet B which is generally used as the format of a transmitted packet in the PHY_3. Alternatively, the packet A can be transmitted by being included in the packet B. The packet A may be entirely or partially included in data transmission part of the packet B. If the packet A is transmitted by being entirely or partially included in the packet B, it is possible to maintain a format of the packet A. If the BS-b transmits the packet A by using the piggyback method, the UE has to recognize that the packet A is transmitted through the PHY_3.

Second, a method of sharing a UE identifier (ID) can be used. In this method, a packet A to which the UE ID used by the BS-a is directly applied is transmitted through the PHY_3. If the packet A to which the UE ID used only by the BS-a is applied is received from the BS-b, the UE recognizes that the packet A is transmitted via the BS-b. In this case, the UE ID used by the BS-a must not be used by the BS-b. For this, specific BSs can constitute a cluster, and a UE ID cannot be reused in the cluster.

Third, a method of sharing a cell ID and a UE ID can be used. In this method, a packet A to which the cell ID and the UE ID used by the BS-a are directly applied is transmitted through the PHY_3. Accordingly, the UE can recognize that the packet A is transmitted from the BS-b through the PHY_3.

Figure 17:
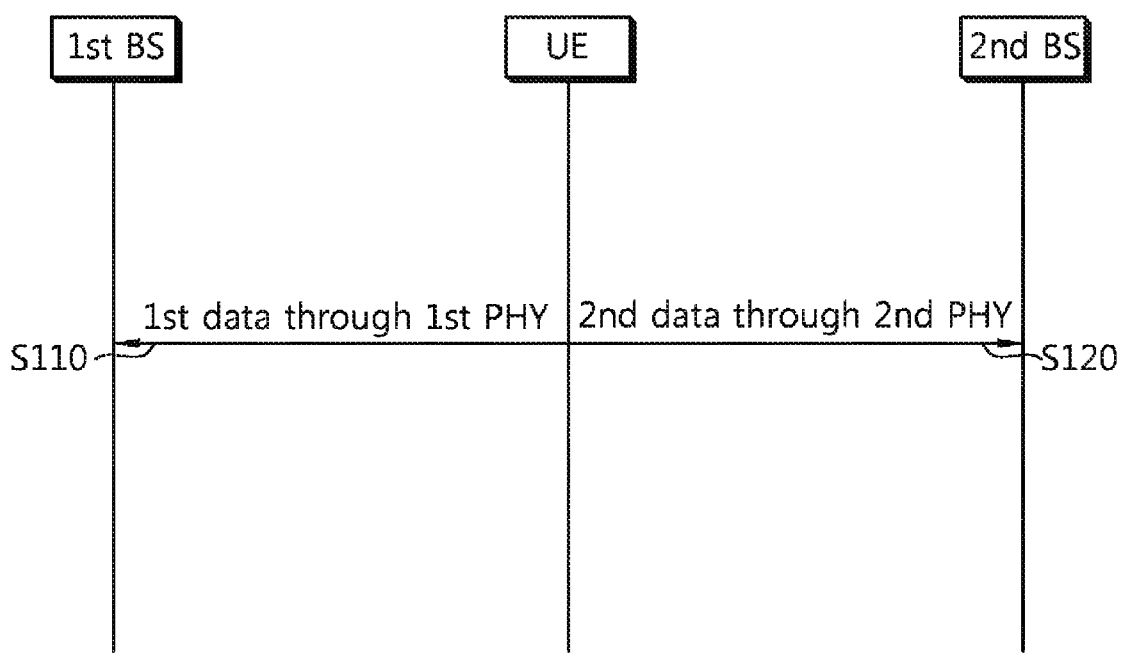
FIG. 17 is a flow diagram showing a method of transmitting data according to an embodiment of the present invention.

FIG. 17 is a flow diagram showing a method of transmitting data according to an embodiment of the present invention.

Referring to FIG. 17, a UE transmits first data through a first physical channel to a first BS (step S110). The UE transmits second data through a second physical channel to a second BS (step S120). The first data and the second data are simultaneously transmitted.

Each of the first data and the second data may be transmitted using a different multiple access scheme. For example, the first data may be transmitted on a SC-FDMA signal, and the second data may be transmitted on an OFDMA signal.

The first data may comprise information regarding the second BS, and the second data may comprise information regarding the first BS.

Figure 18:
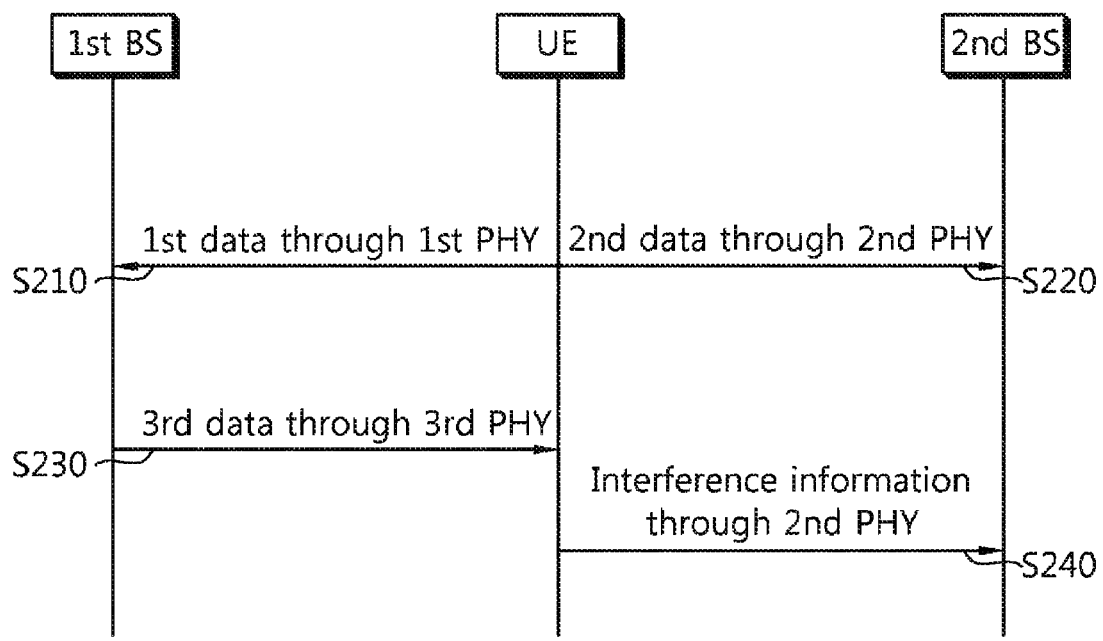
FIG. 18 is a flow diagram showing a method of transmitting data according to another embodiment of the present invention.

FIG. 18 is a flow diagram showing a method of transmitting data according to another embodiment of the present invention.

Referring to FIG. 18, a UE transmits first data through a first physical channel to a first BS (step S210). The UE transmits second data through a second physical channel to a second BS (step S220). The first data and the second data are simultaneously transmitted. The UE receives third data through a third physical channel from the first BS (step S230). The UE transmits interference information through the second physical channel to the second BS (step S240). The interference information is information regarding interference generated for the third physical channel by the second BS. The third data may be received on an OFDMA signal.

Figure 19:
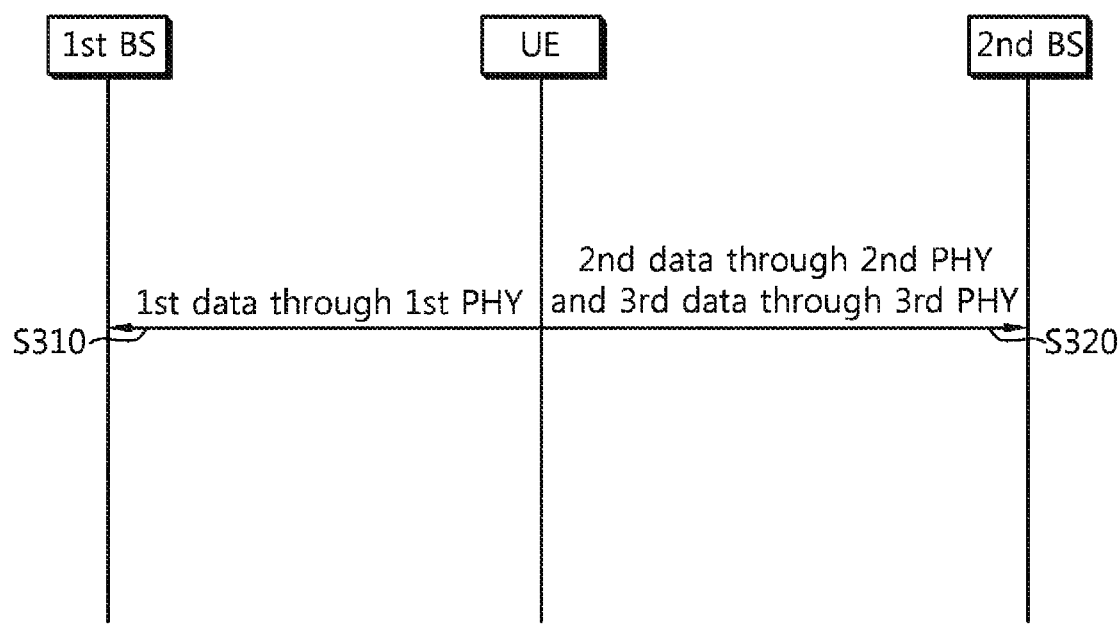
FIG. 19 is a flow diagram showing a method of transmitting data according to another embodiment of the present invention.

FIG. 19 is a flow diagram showing a method of transmitting data according to another embodiment of the present invention.

Referring to FIG. 19, a UE transmits first data through a first physical channel to a first BS (step S310). The UE transmits second data through a second physical channel and third data through a third physical channel to a second BS (step S320). The first data, the second data, and the third data are simultaneously transmitted. The second data and the third data may be transmitted using a clustered SC-FDMA scheme.

The aforementioned multi-RE system based on a plurality of PHYs can also apply to a relay station, a repeater or a femtocell which are used to increase a cell coverage in a multi-cell environment. The aforementioned BS may be a system (or a transmitter/receiver) which is used to transmit/receive radio data with a specific coverage. For example, the BS may be the relay station, the repeater, or the femtocell. Therefore, a plurality of BSs may be different types of transmitters/receivers. For example, the BS-a may be a general BS, the BS-b may be the relay station, the repeater, the femtocell, or the like.

As such, in a multi-RF system of a multi-cell environment, a plurality of PHYs can be simultaneously allocated to one UE by a plurality of BSs so that data can be transmitted to and received from the plurality of BSs. Accordingly, performance of a UE located in a cell edge can be improved. Further, information regarding inter-cell interference can be transmitted to a neighboring cell without a great delay, and thus a multi-cell system can be optimized. Furthermore, if the UE moves from one BS to another BS, data can be shared between the BSs to enable a handover satisfying quality of service (QoS).

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What has been described above includes examples of the various aspects. It is, of course, not possible to describe every conceivable combination of components or methodologies for purposes of describing the various aspects, but one of ordinary skill in the art may recognize that many further combinations and permutations are possible. Accordingly, the subject specification is intended to embrace all such alternations, modifications and variations that fall within the spirit and scope of the appended claims.

The invention claimed is:

1. A method of receiving data in a multi-cell environment, the method being performed by a user equipment (UE) configured to communicate with a first cell and a second cell, the method comprising:
   receiving, from the first cell, first control information on a first downlink channel of the first cell through a physical downlink control channel (PDCCH) region;
   receiving, from the first cell, second control information on a second downlink channel of the second cell through the PDCCH region;
   receiving a first downlink data through the first downlink channel from the first cell, based on the first control information;

receiving a second downlink data through the second downlink channel from the second cell, based on the second control information;

determining a common uplink channel for both the first cell and the second cell; and performing a transmission through the determined common uplink channel to only one cell of: the first cell and the second cell, wherein the common uplink channel is used for transmitting, at the same time, both of: information for the first cell and information for the second cell to only the only one cell of the first cell and the second cell, and wherein both of the information for the first cell and the information for the second cell transmitted on the uplink channel are related to a hybrid automatic repeat request (HARQ) operation.

2. The method of claim 1, further comprising transmitting feedback information on least one of: a precoding and a power control.

3. The method of claim 1, further comprising transmitting feedback information on least one of: a location of the UE and an interference.

4. The method of claim 1, further comprising
transmitting a first uplink data to the first cell; and
transmitting a second uplink data to the second cell.

5. The method of claim 4, wherein the first uplink data is transmitted on a single carrier-frequency division multiple access (SC-FDMA) signal.

6. The method of claim 1, wherein the UE supports a carrier aggregation.

7. The method of claim 1, wherein each bandwidth of the first downlink channel and the second downlink channel corresponds to a maximum of 20 megahertz (MHz).

8. The method of claim 1, wherein the UE supports a maximum of 100 megahertz (MHz) for a carrier aggregation.

9. A user equipment, comprising:
a transceiver configured to communicate with a first cell and a second cell; and
a processor coupled with the transceiver and configured to:

receive, from the first cell, first control information on a first downlink channel of the first cell through a physical downlink control channel (PDCCH) region;

receive, from the first cell, second control information on a second downlink channel of the second cell through the PDCCH region;

receive a first downlink data through the first downlink channel from the first cell, based on the first control information;

receive a second downlink data through the second downlink channel from the second cell, based on the second control information;

determine a common uplink channel for both the first cell and the second cell; and perform a transmission through the determined common uplink channel to only one cell of: the first cell and the second cell, wherein the common uplink channel is used for transmitting, at the same time, both of: information for the first cell and information for the second cell to only the only one cell of the first cell and the second cell, and wherein both of the information for the first cell and the information for the second cell transmitted on the uplink channel are related to a hybrid automatic repeat request (HARD) operation.

10. The user equipment of claim 9, wherein the processor is further configured to transmit feedback information on least one of: a precoding and a power control.

11. The user equipment of claim 9, wherein the processor is further configured to transmit feedback information on least one of: a location of the UE and an interference.

12. The user equipment of claim 9, wherein the transceiver supports a carrier aggregation.

13. The user equipment of claim 9, wherein each bandwidth of the first downlink channel and the second downlink channel corresponds to a maximum of 20 megahertz (MHz).

14. The user equipment of claim 9, wherein the transceiver supports a maximum of 100 megahertz (MHz) for a carrier aggregation.

* * * * *